US008784198B2

(12) United States Patent
Walker et al.

(10) Patent No.: US 8,784,198 B2
(45) Date of Patent: *Jul. 22, 2014

(54) METHOD AND APPARATUS FOR CONDUCTING OR FACILITATING A PROMOTION

(71) Applicant: Walker Digital. LLC, Stamford, CT (US)

(72) Inventors: Jay S. Walker, Ridgefield, CT (US); Geoffrey M. Gelman, Brooklyn, NY (US); James A. Jorasch, New York, NY (US); Peter Kim, Cupertino, CA (US); Timothy A. Palmer, Mountain View, CA (US); Keith Bemer, Pittsburgh, PA (US); Andrew P. Golden, Jamaica Plain, MA (US); Scott Allison, Stamford, CT (US)

(73) Assignee: Inventor Holdings, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/734,034

(22) Filed: Jan. 4, 2013

(65) Prior Publication Data

US 2013/0130787 A1    May 23, 2013

Related U.S. Application Data

(63) Continuation of application No. 13/226,191, filed on Sep. 6, 2011, now Pat. No. 8,366,544, which is a continuation of application No. 11/425,027, filed on Jun. 19, 2006, now abandoned, which is a continuation of application No. 09/604,898, filed on Jun. 28, 2000, now abandoned.

(60) Provisional application No. 60/183,391, filed on Feb. 18, 2000.

(51) Int. Cl.
*G06F 17/00*    (2006.01)

(52) U.S. Cl.
USPC ............................................. 463/29

(58) Field of Classification Search
USPC .................. 463/29–33, 42; 705/14.4
See application file for complete search history.

(56) References Cited

U.S. PATENT DOCUMENTS

| 5,069,453 A | 12/1991 | Koza et al. |
| 5,227,874 A | 7/1993 | Von Kohorn |

(Continued)

FOREIGN PATENT DOCUMENTS

JP    05101236 A    4/1993

OTHER PUBLICATIONS

McQuillen, Daniel, "Coupons Go Digital", Sep. 1995, Incentive, Section: vol. 169, No. 9, ISSN: 1042-5195, CODEN: ICTMBW, at p. 9, 1 pg.

(Continued)

*Primary Examiner* — Ronald Laneau
(74) *Attorney, Agent, or Firm* — Fincham Downs, LLC; Magdalena M. Fincham

(57) ABSTRACT

A method and apparatus for conducting a promotion and for distributing promotions to potential users provide a merchant or promotion organizer flexibility in the way they conduct the promotion as well as an ability to change one or more aspects of the promotion during the operation of the promotion. One or more outcomes are generated by a controller and provided to a user. In addition, one or more codes which allow the outcomes to be revealed or unlocked are generated by the controller and provided to an intermediary. In exchange for completing or satisfying a qualifying action or criteria, the user may receive a code from the intermediary. The user can then unlock an outcome to reveal a prize, benefit, symbol, value, etc., associated with the unlocked outcome. The user may provide a redemption request to either the controller or the intermediary based on the unlocked outcome to receive a benefit or prize associated with the unlocked outcome.

33 Claims, 16 Drawing Sheets

(56) References Cited

U.S. PATENT DOCUMENTS

| | | | |
|---|---|---|---|
| 5,250,789 A | 10/1993 | Johnsen | |
| 5,365,575 A | 11/1994 | Katz | |
| 5,424,524 A | 6/1995 | Ruppert et al. | |
| 5,569,082 A | 10/1996 | Kaye | |
| 5,664,948 A | 9/1997 | Dimitriadis et al. | |
| 5,709,603 A | 1/1998 | Kaye | |
| 5,768,382 A | 6/1998 | Schneier et al. | |
| 5,791,990 A | 8/1998 | Schroeder et al. | |
| 5,791,991 A | 8/1998 | Small | |
| 5,794,210 A | 8/1998 | Goldhaber et al. | |
| 5,806,045 A | 9/1998 | Biorge et al. | |
| 5,826,240 A | 10/1998 | Brockman et al. | |
| 5,871,398 A | 2/1999 | Schneier et al. | |
| 5,880,449 A | 3/1999 | Teicher et al. | |
| 5,916,024 A | 6/1999 | Von Kohorn | |
| 5,918,211 A | 6/1999 | Sloane | |
| 5,939,695 A | 8/1999 | Nelson | |
| 5,950,173 A | 9/1999 | Perkowski | |
| 5,979,757 A | 11/1999 | Tracy et al. | |
| 5,983,091 A | 11/1999 | Rodriguez | |
| 5,984,182 A | 11/1999 | Murrah et al. | |
| 5,995,015 A | 11/1999 | DeTemple et al. | |
| 6,017,032 A | 1/2000 | Grippo et al. | |
| 6,061,660 A | 5/2000 | Eggleston et al. | |
| 6,251,017 B1* | 6/2001 | Leason et al. | 463/42 |
| 6,330,543 B1 | 12/2001 | Kepecs | |
| 6,379,251 B1 | 4/2002 | Auxier et al. | |
| 6,663,105 B1 | 12/2003 | Sullivan et al. | |
| 6,685,562 B1 | 2/2004 | Rantanen | |
| 7,753,792 B2* | 7/2010 | Walker et al. | 463/42 |
| 7,753,793 B2 | 7/2010 | Walker et al. | |
| 7,976,373 B2* | 7/2011 | Kroeckel et al. | 463/16 |
| 7,976,376 B2* | 7/2011 | Kroeckel et al. | 463/20 |
| 8,160,304 B2* | 4/2012 | Rhoads et al. | 382/107 |
| 2002/0128903 A1* | 9/2002 | Kernahan | 705/14 |
| 2003/0050831 A1 | 3/2003 | Klayh | |
| 2005/0033642 A1 | 2/2005 | Mothwurf | |
| 2005/0221889 A1 | 10/2005 | Dupray et al. | |
| 2006/0069749 A1 | 3/2006 | Herz et al. | |
| 2007/0180249 A1* | 8/2007 | Hatakeyama | 713/176 |

OTHER PUBLICATIONS

McQueen, Patricia A., "Worldwide Web Surfing Adventure", Jul. 1996, International Gaming and wagering Business, Section: ISSN: 8750-8222, at p. 65, 2 pp.

Rowh, Mark, "The Low-Cost, No-Cost Approach to Software;Brief Article", Nov. 1, 1999, OfficeSystems99,Section: No. 11, vol. 16, ISSN: 8750-3441, at p. 8, 2 pp.

Stock, Helen, "Supermarket Industry Shopping for Ways to Reduce Payment Expenses", Nov. 29, 1999, Monday, The American Banker, Section: Cards; at p. 13, 2 pp.

"Creating an Online Promotion Just Got Easy!; Realtime Media'S 'Easy Money' Provides Easy, Low-Cost Method to Offer Instant-Win Prizes Up to $50,000", Dec. 28, 1999, Tuesday, PR Newswire, Section: Financial News, 2 pp.

"Cinram Cuts Second E-Commerce Deal", Feb. 7, 2000, DVD Report, Section: vol. 5, No. 6, 1 pg.

"Cybergold Tour", Download Date Feb. 14, 2000, www.cybergold.com/tour/index.html, 3 pp.

Declaration of Non-Establishment of International Search Report PCT/US01/05235 dated Apr. 19, 2001, 2 pp.

Written Opinion for PCT/US01/05235 dated Mar. 12, 2008, 4 pp.

Washington Post article "Facing the Crowds" Stephanie Stoughton, Dec. 4, 1999. 3 pp.

Office Action for U.S. Appl. No. 09/604,898 mailed Aug. 12, 2013, 21 pp.

Office Action for U.S. Appl. No. 09/604,898 mailed Jan. 14, 2004, 19 pp.

Office Action for U.S. Appl. No. 09/604,898 mailed Nov. 30, 2004, 47 pp.

Office Action for U.S. Appl. No. 09/604,898 mailed Mar. 24, 2006, 21 pp.

Final Office Action for U.S. Appl. No. 09/604,898 mailed Oct. 19, 2006, 22 pp.

Office Action for U.S. Appl. No. 09/604,898 mailed Mar. 5, 2007, 16 pp.

Office Action for U.S. Appl. No. 09/604,898 mailed Dec. 7, 2007, 21 pp.

Office Action for U.S. Appl. No. 09/604,898 mailed Dec. 15, 2008, 24 pp.

Office Action for U.S. Appl. No. 11/425,038 mailed Oct. 19, 2010, 10 pp.

Final Office Action for U.S. Appl. No. 11/425,038 mailed Mar. 4, 2011, 12 pp.

Office Action for U.S. Appl. No. 11/425,027 mailed Oct. 19, 2010, 9 pp.

Final Office Action for U.S. Appl. No. 11/425,027 mailed Mar. 3, 2011, 15 pp.

Office Action for U.S. Appl. No. 11/425,031 mailed Oct. 29, 2010, 9 pp.

Office Action for U.S. Appl. No. 13/226,191 mailed May 4, 2012, 6 pp.

Notice of Allowance for U.S. Appl. No. 13/226,191 mailed Oct. 5, 2012, 5 pp.

* cited by examiner

| OUTCOME IDENTIFIER 650 | DISTRIBUTION STATUS 652 | DATE ISSUED 654 | USER DEVICE IDENTIFIER 656 | PAYOUT 658 | REDEEMED 660 | INTERMEDIARY IDENTIFIER 662 | PAID FOR 664 |
|---|---|---|---|---|---|---|---|
| O-000001 | ISSUED | 12/4/2003 | UD 589D | $50 | YES | I-354 | YES |
| O-000002 | ISSUED | 12/4/2003 | UD 453D | $0 | NO | N/A | N/A |
| O-000003 | AVAILABLE | N/A | N/A | $0 | NO | N/A | N/A |

| USER DEVICE IDENTIFIER 700 | USER NAME 702 | FINANCIAL ACCOUNT IDENTIFIER 704 | ADDRESS 706 |
|---|---|---|---|
| UD-234D | JOE SMITH | 0000-0000-0000-0000 | 1039 SUMMER ST. STAMFORD, CT |
| UD-593D | HANK SANDERS | 1111-1111-1111-1111 | 203-654-3210 |
| UD-202D | JANET FONZA | 2222-2222-2222-2222 | JANET@FONZA.COM |

FIG. 10

| INTERMEDIARY DEVICE IDENTIFIER 720 | INTERMEDIARY NAME 722 | INTERMEDIARY ADDRESS 724 |
|---|---|---|
| ID-353 | JOE'S SOUP | SERVICE@ JOESOUP.COM |
| ID-251 | SAM'S GRILL | 40 MAIN ST. NORWALK, CT |
| ID-933 | JANE'S APPAREL | 212-345-6789 |

FIG. 11

| OUTCOME POSITION 800 | OUTCOME IDENTIFIER 802 | PAYOUT 804 | STATUS 806 | UNLOCK CODE 808 | CATEGORY 810 | INTERMEDIARY IDENTIFIER 812 |
|---|---|---|---|---|---|---|
| OP-0001 | OI-34503 | $100 | USED | 568943 | GOLD | I-354 |
| OP-0002 | OI-54303 | $0 | USED | 345234 | SILVER | I-235 |
| OP-0003 | OI-67890 | $0 | UNUSED | N/A | GOLD | N/A |

| ACTIVITY IDENTIFIER 900 | ACTIVITY DESCRIPTION 902 | UNLOCK CODE 904 |
|---|---|---|
| A-001 | PURCHASE > $100 | 568943 |
| A-002 | IN LINE > 3 MINUTES | 345234 |

FIG. 15

| TRANSACTION IDENTIFIER 920 | UNLOCK CODE 922 | DATE/TIME 924 | USER DEVICE IDENTIFIER 926 |
|---|---|---|---|
| T-0001 | 568943 | 12/6/2003 4:30 PM | UD-423D |
| T-0002 | 345234 | 12/6/2003 4:32 PM | UD-523D |

FIG. 16

METHOD AND APPARATUS FOR CONDUCTING OR FACILITATING A PROMOTION

The present application is a Continuation Application of U.S. application Ser. No. 13/226,191, filed on Sep. 6, 2011 in the name of Walker et al. and entitled METHOD AND APPARATUS FOR CONDUCTING OR FACILITATING A PROMOTION, which application is a Continuation Application of U.S. application Ser. No. 11/425,027, now abandoned, filed on Jun. 19, 2006 in the name of Walker et al. and entitled METHOD AND APPARATUS FOR CONDUCTING OR FACILITATING A PROMOTION. Application Ser. No. 11/425,027 is, in turn, a Continuation Application of U.S. application Ser. No. 09/604,898, now abandoned, which was filed on Jun. 28, 2000 in the name of Walker et al., entitled METHOD AND APPARATUS FOR CONDUCTING OR FACILITATING A PROMOTION and claimed the benefit of U.S. Provisional Application Ser. No. 60/183,391 (which Provisional Application was filed on Feb. 18, 2000 in the name of Walker et al. and entitled STORED OUTCOMES ON A PDA). The entirety of each of these applications is incorporated by reference herein for all purposes.

BACKGROUND OF THE INVENTION

1. Field of the Invention

The present invention relates generally to a method and apparatus for conducting a promotion and, more particularly, to a method and apparatus for distributing promotions to potential participants and for allowing the promotion participants to receive benefits associated with the promotions.

2. Description of the Prior Art

Merchants and manufacturers often use promotions to entice people to try or purchase products, shop or conduct transactions in certain stores, or to make people aware of products, store locations, sales, etc. Unfortunately, many such promotions suffer from a number of drawbacks. For example, promotions for which paper coupons, flyers, invitations, promotion entry forms, promotion rules, etc., must be printed may incur significant printing and distribution costs. Furthermore, knowing how many paper coupons, flyers, invitations, promotion entry forms, promotion rules, etc., to print may be difficult to predict, thereby often causing a merchant or manufacturer conducting the promotion to print too many or too few of the necessary items.

Additional problems for print based promotions may result when a merchant or manufacturer conducting the promotion desires to change a rule, benefit, prize, entry criteria, redemption criteria, or other aspect of the promotion once the promotion has started, or at least after the merchant or manufacturer has printed or distributed the printed items necessary for the promotion. Merchants and manufacturers may desire to change one or more aspects of a promotion while the promotion is on-going so as to encourage more people to participate in the promotion, to correct or change any inconsistencies or errors in the promotion or promotion related materials, etc.

Many promotions are based on a randomized distribution of prizes among promotion tickets or coupons. That is, a person may be given or sold one or more coupons or coupon numbers. If the person's coupon or coupon number is deemed to be a "winning" coupon, the person may win a prize associated with the winning coupon. For example, a classic lottery allows a person to pick or receive a set of numbers associated with a lottery ticket. If the person's numbers are chosen, the person generally wins a monetary prize. Such a lottery promotion is typically conducted by a government regulated lottery organization, which contracts with merchants to sell lottery tickets to consumers. The merchants have little control over the price of the lottery tickets, the prizes or benefits associated with winning lottery tickets, the advertising of the lottery promotion, or any conditions that a consumer must satisfy before purchasing a lottery ticket. Therefore, merchants have little ability to tailor such promotions to their products or market niches, customer demographics, inventory levels, etc.

Thus, despite the state of the art methods and systems for conducting lotteries and other promotions, there remains a need for a method and apparatus for conducting a promotion that overcomes the problems associated with print oriented promotions while providing a merchant or promotion organizer flexibility in the operation of the promotion as well as the ability to change one or more aspects of the promotion during the operation of the promotion.

SUMMARY OF THE INVENTION

Accordingly, it is an object of the present invention to provide a method and apparatus for conducting or enabling a promotion and to provide a method and apparatus for distributing promotions or portions of promotions to potential users. The method and apparatus of the present invention provides a merchant or promotion organizer flexibility in the way they conduct or operate the promotion as well as an ability to change one or more aspects of the promotion during the operation of the promotion. Such benefits can be achieved while reducing, or even eliminating in some cases, the costs and other shortcomings associated with print based promotions.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, a method for conducting a promotion includes generating an outcome, generating an unlock code associated with the outcome, providing an indication of the outcome, providing an indication of the unlock code, and providing an indication of a benefit associated with the outcome. In general, when created, an outcome is "locked" or otherwise hidden or covered so that any prize, value, symbol or other benefit associated with the outcome may only be viewed, displayed or otherwise determined after the outcome is "unlocked" or otherwise revealed with an unlock code.

Outcomes and/or unlock codes may be generated and/or provided by a controller or other central source. The controller or central source may be operated by, for or on behalf of a lottery organization or other organization desiring to operate or conduct a promotion.

Either or both of an outcome and an unlock code may be provided to a user, user device, intermediary and/or intermediary device. Typically, an intermediary may be, include, or function on behalf of a merchant, a group of merchants (e.g., a shopping mall), a franchisee, etc. that desires to operate a promotion or participate in a promotion. In some embodiments, a controller may provide an outcome to a user or user device and an unlock code capable of unlocking the outcome to an intermediary or intermediary device, or vice versa. The user may then receive the unlock code for the outcome from the intermediary or intermediary device.

In some embodiments, a qualifying action may be associated with either the outcome or the unlock code. The benefit associated with the outcome may not be provided until after the qualifying action is completed. Completion or satisfaction of the qualifying action may need to be verified in some embodiments or implementations. In other embodiments, the outcome, unlock code, benefit and/or qualifying action may have an expiration date associated with them or they may otherwise be terminated from further use.

After a user or user device unlocks an outcome, the user or user device may provide a redemption request or other indication to the controller. The redemption request may inform the controller of the unlocking of the outcome, request that the user be provided with a benefit (e.g., a free dinner at a restaurant, a discount coupon, a car, five hundred dollars, a free lottery ticket, a free outcome, a free unlock code, a cruise, etc.) associated with the outcome, request another outcome or unlock code, etc. In some embodiments, an intermediary or intermediary device may provide the redemption request.

There may be a one-to-one, one-to-many, many-to-one, and many-to-many relationship between outcomes and unlock codes. Thus, an outcome may be unlockable by one and only one unlock code or by many unlock codes. In addition, an unlock code may be able to unlock only one outcome or many outcomes. In some embodiments, an unlock code may be capable of unlocking many outcomes, but the unlock code may not be reused after it is used to unlock a first one of the many outcomes.

To further achieve the foregoing and other objects and in accordance with the purposes of the present invention, as embodied and broadly described herein, a system for conducting a promotion includes a memory, a communication port, and a processor connected to the memory and the communication port, said processor being operative to generate an outcome, generate an unlock code associated with the outcome, provide an indication of the outcome, provide an indication of the unlock code; and provide an indication of a benefit associated with the outcome.

Also to achieve the foregoing and other objects and in accordance with the purposes of the present invention, as embodied and broadly described herein, a computer readable medium for use in a promotion system, the computer readable medium storing a computer program including computer readable means for producing an outcome, computer readable means for producing a reveal code associated with the outcome, computer readable means for sending an indication of the outcome, computer readable means for sending an indication of the reveal code, and computer readable means for sending an indication of a benefit associated with the outcome.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings:

FIG. 9 is a tabular representation of a possible data structure for the outcome database of FIG. 8;

FIG. 10 is a tabular representation of a possible data structure for the user database of FIG. 8;

FIG. 11 is a tabular representation of a possible data structure for the intermediary database of FIG. 8;

FIG. 13 is a tabular representation of a possible data structure for the user outcome database of FIG. 12;

FIG. 15 is a tabular representation of a possible data structure for the unlock database of FIG. 14; and FIG. 16 is a tabular representation of a possible data structure for the transaction database of FIG. 14.

DETAILED DESCRIPTION OF THE EMBODIMENTS

Figure 1:
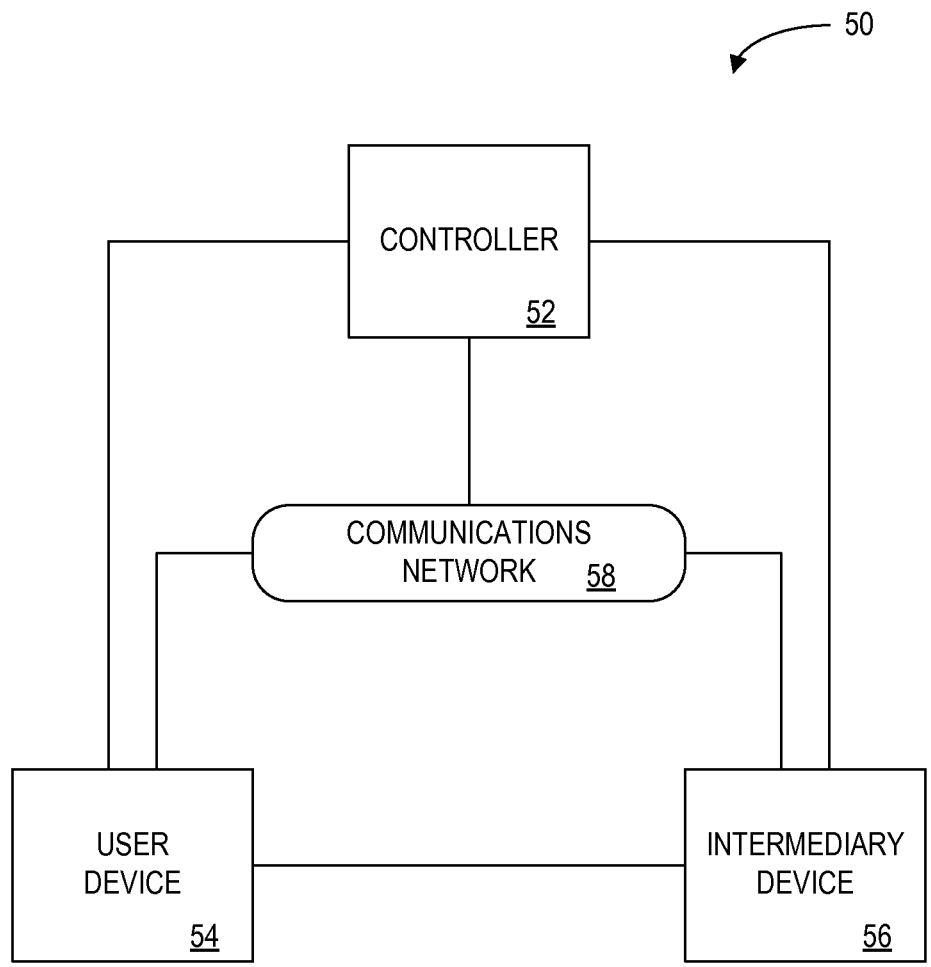
FIG. 1 is a block diagram of system components for an embodiment of an apparatus usable with the method of the present invention.

The present invention is directed to a method and apparatus for conducting a promotion wherein one or more outcomes are generated or created by a controller or other source and then provided to a user. A user may win, or be entitled to receive, upon the completion or satisfaction of a qualifying action or criteria, an outcome with a specific prize or benefit associated with it that, such as a television, ten-thousand dollars, a coupon worth a ten percent discount on a purchase of a future product, a free oil change for a car, etc. Alternatively, an outcome may not have a specific or identifiable prize or benefit associated with it, but may have a value, symbol, or other identifier associated with it, such as a picture of a cherry or orange, the number "4," an alphanumeric prize identifier, etc. A prize or benefit may then be associated with the value, symbol or other identifier associated with the outcome at a later time by a merchant, manufacturer, controller or other central source, or other entity or device. For example, a merchant may associate a prize of a ten-percent off coupon with an outcome of "cherry" while a different merchant may associate a prize of a free product with an outcome of "cherry."

Each outcome may be generated, transmitted and/or stored by a controller or other device in electronic form. Therefore, a user may receive or download one or more outcomes via electronic transmission from the controller and store the outcomes on a user or customer device, such as a personal digital assistant, laptop computer, cellular telephone, etc. In some embodiments, a user may be able to receive hundreds, thousands, etc., of outcomes and store and use them simultaneously on a single user or other customer device.

When originally created, an outcome may be hidden, covered up, masked, concealed, encoded, or otherwise "locked" (with includes a partially "locked" outcome) such that the result of the outcome or the prize, benefit, value, symbol, etc. associated with the outcome is not knowable solely as a result of having possession of, or access to, the outcome. In some embodiments, a "locked" outcome cannot be revealed, accessed, displayed, determined, etc. by anyone who receives the outcome with an appropriate "unlock" code that allows the prize, benefit, value, symbol, etc., associated with the outcome to be revealed, displayed, accessed, determined, etc. The term "locked," as used herein, should be construed broadly and is not meant to imply or suggest any specific manner or method of hiding, covering, encoding or encrypting, storing, screening, concealing, masking, etc. a prize, value, symbol, or other benefit associated with an outcome or to limit how a prize, value, symbol, or other benefit associated with the outcome is hidden, covered, encoded or encrypted, stored, screened, concealed, masked, etc.

In some embodiments, an unlock code used to unlock an outcome may include or otherwise provide some or all of the information or data needed to associate a benefit with an outcome, identify, select or otherwise determine a benefit associated with the outcome, complete a benefit being revealed by the unlock code, etc.

In general, a user having a locked outcome will need to reveal, display, uncover or otherwise "unlock" the outcome in order to see or reveal the prize, benefit, value, symbol, etc. associated with the outcome. An unlock code may also be generated by a controller or other device and associated with the outcome so that a user that has or receives the unlock code from the controller can see, access, or otherwise "unlock" the previously received locked outcome, thereby allowing the user to determine or see a result of the outcome or a prize, benefit, value, symbol, etc., associated with the outcome. As used herein, in addition to its common meaning, the phrase "associated with" for describing a relationship between an outcome and an unlock code shall also be taken to describe the fact that the unlock code can unlock the outcome and that the unlock code is capable of unlocking the outcome. Thus, an outcome might be associated with one or more unlock codes and an unlock code may be associated with one or more outcomes.

In some embodiments, a user or user device may receive an unlock code for an outcome before receiving the locked outcome itself. An unlock code can comprise or include a written, spoken or data entered password, a radio or television signal, a sequence or group of keypad selections or entries, a sequence or group of handwritten or spoken entries, an electronic or electromagnetic signal, a numerical or alphanumerical sequence, a sequence, group or combination of musical notes or other sounds, words, syllables, phrases, tones, etc. to be provided audibly or symbolically to unlock an outcome, a barcode, a decoding key, rule or algorithm for a code or cypher, etc. An unlock code can also be based on, include, or comprise an identifier associated with a particular user, user device, intermediary, intermediary device, etc. receiving the unlock code or otherwise being allowed to use or distribute the unlock code An unlock code may also include user biometric information (e.g., voiceprint, fingerprint, retinal scan, DNA, etc. information) so that the unlock code may only be used by a specific user. A controller or other device generating the unlock code may access a database of previously stored biometric information when generating or otherwise creating the unlock code. Alternatively, a user requesting an unlock code may supply the biometric information when providing the request so that the biometric information can be included in the unlock code or otherwise used to create the unlock code. In some embodiments, user biometric information may also be used when creating or generating outcomes or to otherwise associate a specific outcome with a specific user, change an outcome depending on which user has possession of the outcome, etc.

Software resident and operating on a user device may keep any outcomes received by and stored on the user device locked until a code is available to unlock the outcome. When a user receives an unlock code, the software on the user device may allow the user to unlock one or more of the outcomes stored on the user device. The user may be able to determine or select an outcome to unlock. Alternatively, the user device and associated software may determine or select which outcome to unlock. In some embodiments, an unlock code may be able to unlock only one outcome, such as in implementations where a one-to-one relationship exists between unlock codes and locked outcomes. An unlock code also may be generated, transmitted and/or stored in electronic form or as an electronic signal.

In general, one or more outcomes will be generated and provided to one or more users or other people by a central source, such as a controller, a manufacturer, etc. The controller may also generate and provide the outcomes and associated codes to an intermediary, such as a merchant or retailer. The merchant, retailer or other intermediary can then provide a code to a user, thereby allowing the user to unlock one of the previously received outcomes. In some embodiments, the merchant intermediary may or may not know the prize, benefit, value, symbol, etc., associated with any outcome provided by the merchant intermediary to the user.

In order to receive an unlock code that will activate or unlock an outcome, a user may have to satisfy or complete one or more qualifying actions or other criteria. Note that the terms "qualifying action" and "qualifying criteria" will be used interchangeably herein. For example, a user may have to shop at or at least visit a specific merchant, purchase a specific product, use a specific credit card to purchase a product, redeem a specific coupon, participate in a game or group activity, travel to a particular destination by a certain day, notify at least five people of a promotion being conducted by a merchant, hand out leaflets, switch long distance telephone service providers, agree to purchase a magazine subscription, convince at least one other person to download an outcome, attend a particular basketball game, become a museum docent, answer survey questions, apply for a credit card, provide a user identifier, provide a user device identifier, attend a merchant's opening at a new location, commute to work via public transportation as opposed to driving a car, edit or comment on a newspaper article or book, take dancing lessons, graduate from high school diploma or receive high school equivalency degree, try a new shampoo and provide comments on it, try a new restaurant, lose ten pounds, rent a vehicle from a specific automobile rental agency, watch a specific television program, watch a specific television commercial, donate time helping a charity, log on to a specific World Wide Web site, purchase a product on a specific day, send an email to a friend advertising a product or merchant, etc.

The qualifying action or criteria that must be satisfied or completed by a user may be generated or otherwise identified by the central source or controller, or by a merchant. In some embodiments, both a central source and a merchant may require a user to satisfy or complete qualifying actions or criteria before a code is provided to the user that will unlock an outcome. For example, a manufacturer acting as a central source may require that a user purchase a product supplied by the manufacturer in order for the user to receive an unlock code from a merchant. Thus, the manufacturer will not allow the merchant to give an unlock code to the user unless the user purchases a product supplied by the manufacturer. The merchant may require that a user purchase, rent, etc., a product at the merchant before the merchant will provide an unlock code to the user. Thus, in order for the user to receive an unlock code from the merchant, the user must purchase one of the manufacturer's products at the merchant.

In some embodiments selection of a qualifying action may be based on a user's or user device's location within a shopping mall, location in a particular merchant or other intermediary, location in a city, etc. The location of the user or the user device may be determined via a Global Positioning System (GPS) detector, sensor or receiver in the user device, by a tracking device attached to the user or user device, etc.

In some embodiments, unlock codes may be available for free or without requiring a qualifying action to be completed. For example, in some embodiments only a simple request to receive one or more unlock codes is received, there is no associated qualifying action for the unlock codes. In such embodiments, a user may request one or more unlock codes via mail, email, facsimile, telephone call, etc., and receive the unlock codes via mail, email, facsimile, telephone call, etc.

Once a user has received a code from a merchant, the user can use the code to unlock at least one outcome previously received by the user and stored on a user device. In some embodiments, the user may be able to unlock more than one outcome with a code or to select which of the user's stored outcomes will be unlocked by the code. Once unlocked, an outcome may reveal that the user has won or is entitled to receive a specific prize, such as a T-shirt, car, five-thousand dollars, cruise vacation, lottery ticket, frequent flyer miles, etc. Alternatively, the unlocked outcome may reveal a symbol or value, such as "cherry." The user may then have to check with or access the source of the outcome, such as a controller, to determine a specific prize or benefit associated with an outcome of "cherry." Alternatively, the merchant or other intermediary that provided the code to the user may designate or indicate the specific prize or benefit associated with the unlocked outcome of "cherry." In some embodiments, an unlocked outcome may need to be combined with other unlocked outcomes to entitle a user to receive a prize. For example, three unlocked outcomes of "cherry" may needed to entitle a user to a grand prize. Each "cherry" outcome may entitle the user to ten dollars while the group of three "cherry" outcomes may entitle the user to one hundred dollars.

The method and apparatus of the present invention may operate in both lottery and non-lottery type implementations. An example of how the method and apparatus of the present invention may operate in a non-lottery type implementation is as follows. A company, WIN Network.com, generates one million outcomes. Predefined rules for generating outcomes dictate the number of outcomes that entitle users to receive various cash prizes. For example, exactly two of the one million outcomes promise a prize of one hundred thousand dollars, four of the one million outcomes promise fifty thousand dollars, and so on. Therefore, the expected value of each of the outcomes is know in advance and the frequency of each outcome is known in advance. Users can receive locked outcomes free of charge by logging on to the company's World Wide Web site and downloading up to one thousand outcomes at any given time. WIN Network.com makes knowledge of the expected value of the one million outcomes available to potential users who may download or otherwise receive the outcomes and to merchants who may purchase the codes associated with the outcomes.

WIN Network.com also generates one million unlock codes and then sells the unlock codes to various merchants. Merchant A purchases twenty thousand unique unlock codes. Merchant A then advertises that a user may receive an unlock code merely by visiting the merchant and up to ten unlock codes each time the user purchases a product at Merchant A.

A user named Sam logs onto WIN Network.com's World Wide Web site through his user or client device, a personal digital assistant, downloads five hundred outcomes and stores them on his personal digital assistant. Later on, Sam visits the merchant and purchases a product at the merchant. As a result, the merchant gives Sam six unlock codes, one unlock code for visiting the merchant and five unlock codes for purchasing a product at the merchant. Sam receives the unlock codes in electronic form and stores them on his personal digital assistant (i.e., Sam's user device).

When Sam later uses the six codes to unlock six outcomes, four of the six unlocked outcomes indicate "Sorry, please try again," one of the six unlocked outcomes indicates "Congratulations, you have won five dollars!" and the sixth unlocked outcome indicates "cherry." Sam then logs back onto the WIN Network.com's World Wide Web site and provides an identifier of the outcome and the code as part of an outcome redemption request. WIN Network.com then provides Sam a message that indicates that it will send Sam a check for five dollars in the mail. The next time Sam visits Merchant A, Sam shows a clerk or other employee of Merchant A the unlocked outcome of "cherry" as part of an outcome redemption request. The clerk or other employee of Merchant A then indicates to Sam that an outcome of "cherry" entitles Sam to receive a twenty percent discount off of Sam's next purchase at Merchant A. Merchant A may have had a pre-published list or table of what an outcome of "cherry" wins, thereby avoiding the perception that Merchant A has unfairly chosen a prize after the outcome of "cherry" is revealed.

As illustrated in this example, Merchant A did not necessarily know which of the one million outcomes Sam had or what the unlocked outcomes would reveal. In addition, the prize of five dollars could only be redeemed from WIN Network.com, while the prize or benefit associated with the benefit of "cherry" could only be redeemed at Merchant A. Thus, Merchant A had considerable flexibility in determining or establishing a prize associated with the outcome of "cherry." In some embodiments, Merchant A may change a prize or benefit associated with an outcome of "cherry" over time without affecting the operation of WIN Network.com's promotion. In some embodiments, WIN Network.com may let the Merchant A determine all of the prizes or benefits associated with outcomes.

An example of how the method and apparatus of the present invention may operate in a lottery type implementation is as follows. WIN Network.com obtains a batch of one-hundred thousand electronic scratch-off lottery outcomes from a state lottery organization. The outcomes themselves are hidden or locked using a secure encryption algorithm. However, each outcome is associated with a visible or otherwise ascertainable serial number. Along with the outcomes, WIN Network.com receives one hundred thousand decryption codes (i.e., unlock codes) from the state lottery organization. Using the proper decryption or unlock code, a hidden or locked outcome may be revealed.

WIN Network.com pays the state lottery organization ninety-five cents each for the outcomes, thereby paying a total of ninety-five thousand dollars to the state lottery organization. WIN Network.com posts the encrypted lottery outcomes to a web site that is accessible to users via a communications network such as the World Wide Web. Each user is able to download up to one hundred lottery outcomes from WIN Network.com's web site.

WIN Network.com sells or otherwise provides the unlock codes to various merchants and other retailers for one dollar each, thus obtaining one hundred thousand dollars for all the unlock codes. Associated with each unlock code is the serial number of the outcome that the code unlocks.

One retailer to buy the decryption codes is Blue Navy Outfitters. Blue Navy Outfitters then incorporates into its advertisements the fact that it has unlock codes. "Shop here," the advertisements state, "and unlock your WIN Network.com outcomes to reveal fabulous cash prizes. If you don't have any outcomes, just log onto WIN Network.com and download some for free."

A user named Linda sees the Blue Navy Outfitters' advertisement on television. The advertisement catches her attention, and Linda logs onto the WIN Network.com web site through her personal digital assistant (e.g., a Palm Pilot VII™ handheld computer) which functions as a user device for Linda. From WIN Network.com's web site, she downloads one hundred lottery outcomes. Linda then goes to Blue Navy Outfitters to shop. Signs are posted at the Blue Navy Outfitters store saying that the store will provide up to five unlock codes for any purchase made over twenty dollars.

Linda, in need of summer clothing, buys a couple of T-shirts. Her purchase total comes to thirty-three dollars. At the cash register or point-of-sale terminal in the store, a cashier asks Linda if she has WIN Network.com outcomes to unlock. Linda says that she does and presents her personal digital assistant with the locked outcomes stored on it. The cashier attaches a connector from the cash register terminal to Linda's personal digital assistant. The cash register then scans the serial numbers of the locked outcomes stored on Linda's personal digital assistant. The cash register terminal queries a central database operated or accessible by Blue Navy Outfitters to determine whether Blue Navy Outfitters possesses or has access to the unlock codes for any of Linda's locked outcomes. The cash register finishes its search and displays, "You have four outcomes for which we have the unlock codes." The cash register terminal then transmits the appropriate four unlock codes to Linda's personal digital assistant. The outcomes now appear as shiny gold icons on the display of Linda's personal digital assistant. Linda clicks on each outcome in turn, revealing the hidden prize associated with the outcome. The first three outcomes are displayed as, "Sony, you lose." The last outcome is displayed as, "Congratulations, you have won ten dollars!"

Linda takes home her personal digital assistant and logs onto WIN Network.com's web site. She clicks on a special link to redeem prizes. She is prompted to enter the serial number of her winning outcome, together with the amount of the prize, which Linda does. WIN Network.com, in turn, submits the outcome serial number and the prize amount to the state lottery organization. The state lottery responds to WIN Network.com, saying that the prize of ten dollars is indeed the valid prize for the corresponding serial number. WIN Network.com then sends Linda a check for ten dollars. The state lottery organization makes note of the prize that WIN Network.com has paid to Linda, and adds the prize to the total amount of money owed by the state lottery organization to WIN Network.com. At the end of the month, the state lottery organization pays any debt owed to WIN Network.com.

A significant benefit of the method and apparatus of the present invention is that a promotion can be changed dynamically as a promotion develops and unfolds over time, thereby providing substantial flexibility to respond to user and merchant participation levels in the promotion, user and merchant enjoyment level of the promotion, feedback from users and merchants participating in the promotion, etc. For example, the prizes and benefits associated with a promotion can be changed by a merchant or other entity or device as the promotion is being conducted to increase or decrease user interest and participation in the promotion. Thus, a merchant may have flexibility to tailor a promotion to best suit the needs, market niche, inventory levels, customer base, etc., of the merchant. Similarly, a controller operating the promotion on behalf of multiple merchants may be able to dynamically adapt the promotion to maximize the operation of the promotion for the merchants and/or for the controller.

Another significant advantage of the method and apparatus of the present invention is that a promotion can be conducted electronically, thereby providing significant ease of use while increasing potential participation in the promotion and lowering or otherwise limiting printing and distribution costs normally associated with printed promotional items (e.g., coupons, flyers, rules, prizes, outcomes, codes, etc.). An electronically conducted promotion may allow users to participate in and benefit from the promotion via a variety of electronic devices including, but not limited to, personal digital assistants, cellular telephones, kiosks, desktop or laptop computers, workstations, etc., thereby enabling geographically widespread user participation in the promotion while allowing for coding, encryption, and other electronically based techniques to minimize the potential and possibility of user or employee fraud, employee theft, etc., during the promotion.

Another significant advantage of the method and apparatus of the present invention is that a user participating in a promotion may receive significant entertainment. Entertainment may come from the process of obtaining unlock codes and from the manner in which outcomes are revealed to users. For example, a cartoon character might be shown on a user device revealing an unlocked outcome. Entertainment may also include a game, such a roulette wheel, slot machine, video game, board game, trivia game, etc., that a user can play. Unlocking an outcome may enhance or change play of the game, come to a conclusion in the game, increase the user's chances of winning or successfully completing the game, etc. In addition to receiving the entertainment, the user may be able to receive a significant benefit or prize for completing an activity that enables the user to receive a code that will unlock an outcome that is associated with the prize or benefit.

Referring now to FIG. 1, an apparatus or system 50 usable with the method of the present invention is illustrated. The apparatus 50 includes a controller 52 that may communicate with one or more user or client devices 54 and one or more intermediary devices 56 via a computer, data, or communications network 58. The controller 52 may be located at a retailer or merchant, mall, etc., or function as a server for a World Wide Web site.

The controller 52 preferably generates or creates outcomes and/or unlock codes. The controller 52 may also provide outcomes to users or user devices and unlock codes to merchants or their intermediary devices. Alternatively, the controller 52 may provide unlock codes to users or user devices and locked outcomes to merchants or their intermediary devices. The selection of which outcomes and unlock codes to provide to which users, user devices, intermediaries, intermediary devices, etc. can be based on many factors, such as, for example, the location of the users, user devices, intermediaries, intermediary devices, etc.

In some embodiments, the controller 52 may also generate or identify qualifying actions or criteria that a user may have to complete or satisfy before receiving an outcome or a code to unlock an outcome. After a user has unlocked an outcome, the controller 52 may receive a redemption request from a user to provide a benefit, prize, etc., with the unlocked outcome. The configuration, operation and use of the controller 52 will be described in more detail below.

The user or customer device 54 allows a user to interact with the controller 52, the intermediary device 56 and the remainder of the apparatus 50. The user or client device 54 may also enable a user to receive and store outcomes and qualifying actions from the controller 52 and codes and qualifying actions and unlock codes from the intermediary device 56. A user may also use the user device 54 to provide a code or an indication of a completion by the user of one or more qualifying actions, or an indication of a willingness or agreement by the user to complete one or more qualifying actions, to the controller 52 or the intermediary device 56. The user may also use the user device 54 to receive unlock codes from an intermediary device and to unlock outcomes that the user has stored on the user device 54. In some embodiments, after unlocking an outcome, a user may then use the user device to send a redemption request regarding the unlocked outcome to the controller 54 and or the intermediary device 56. In general, a redemption request provided by a user indicates that the user is entitled to receive a prize or other benefit associated with a specific outcome unlocked by the user or the user desires to receive a prize or other benefit associated with a specific unlocked outcome identified by the user in the redemption request. However, a redemption request may not be used or necessary in all embodiments of the present invention.

In some embodiments, the user device or terminal 54 may also be connected to or otherwise in communication with other devices. Possible user devices include a personal computer, portable computer, mobile or fixed user station, workstation, network terminal or server, telephone, beeper, kiosk, dumb terminal, personal digital assistant, facsimile machine, etc. The configuration, operation and use of user devices will be described in more detail below.

The intermediary device 56 may be located at a retailer or merchant, mall, etc., or may function as a World Wide Web site server in an online embodiment. The intermediary device 56 receives and stores codes from the controller 52 and transmits them to users after completion of qualifying actions associated with the codes. In addition, the intermediary device 56 may determine what qualifying action or criteria to associate with an outcome and provide notifications of the qualifying actions or criteria to users. The intermediary device 56 may verify completion of a qualifying action or criteria and provide a notice or indication of such completion to a user device or to the controller 52. In some embodiments, an intermediary device may also receive redemption requests from a user regarding an outcome that the user has unlocked. The configuration, operation and use of intermediary devices will be described in more detail below.

The communications network 58 might be the Internet, the World Wide Web, or some other public or private computer, cable or communications network or intranet, as will be described in further detail below. The communications network 58 is only meant to be generally representative of cable, computer or other communication networks for purposes of elaboration and explanation of the present invention and other devices, networks, etc., may be connected to the communications network 58 without departing from the scope of the present invention. The communications network 58 is also intended to be representative of, and include all or a part of, the Internet, the World Wide Web, and other privately or publicly operated networks. The communications network 58 can also include other public and/or private wide area networks, local area networks, data communication networks or connections, intranets, extranets, cable modems, routers, satellite links, microwave links, cellular or radio links, fiber optic transmission lines, ISDN lines, T1 lines, DSL, etc. Examples of how communication between devices, and between devices and consumers or customers, might operate are illustrated in U.S. Pat. No. 5,995,015 issued to DeTemple et al. U.S. Pat. No. 5,950,173 issued to Perkowski, and U.S. Pat. No. 5,939,173 issued to Nelson, the contents of all three of which are incorporated herein by reference.

As previously discussed above, in some embodiments, the method of the present invention involves operation or activity by a controller or other central source, such as the controller 52, an intermediary device located at a merchant, such as the intermediary device 56, and a user or other client device, such as the user device 54. Now referring to FIG. 2, a method 100 in accordance with the principles of the present invention as performed or completed by the controller 52. In general, the controller 52 will perform or complete all of the method 100. However, some or all of the steps of the method 100 may be completed by the intermediary device 56 and/or the user device 54.

Figure 2:
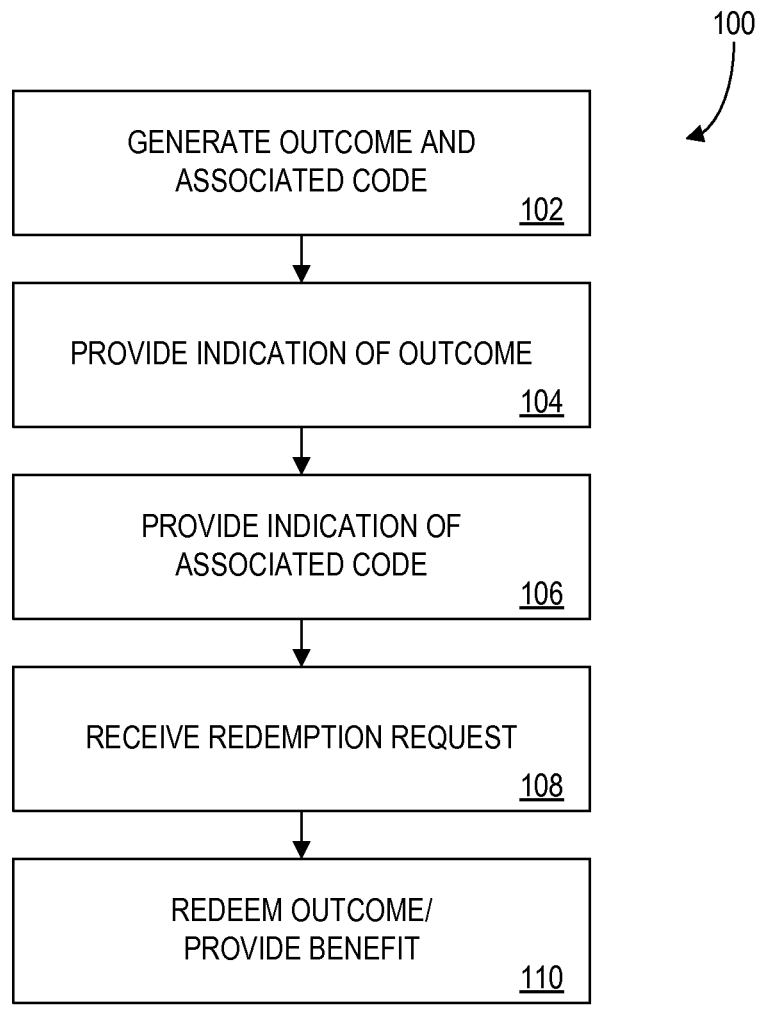
FIG. 2 is a flowchart of a method in accordance with the present invention as conducted by the controller of FIG. 1.

The method 100 illustrated in FIG. 2 includes a step 102 during which the controller 52 generates a locked outcome and an unlock code associated with the outcome, a step 104 during which the controller 52 provides the locked outcome or an indication of the locked outcome determined during the step 102 to a user device, a step 106 during which the controller 52 provides the unlock code or an indication of the unlock code determined during the step 102 to an intermediary device, a step 108 during which the controller 52 receives a redemption request from a user, or a user device associated with the user, a merchant, an intermediary, etc. that has received an unlock code from the intermediary that enabled the user to unlock the outcome determined during the step 102 and provided to the user during the step 104, and a step 110 during which the controller 52 redeems the outcome, displays, reveals or provides a benefit associated with the outcome, etc. Each of the steps 102, 104, 106, 108, 110 will be described in further detail below.

Note that in some embodiments the controller 52 may provide unlock codes instead of locked outcomes to users or user devices during the step 104 and locked outcomes instead of unlock codes to merchants or intermediary devices during the step 106. For practical purposes, the method 100 operates the same in these embodiments as the previously discussed embodiment.

During the step 102, the controller 52 generates one or more outcomes. The outcomes may be a symbol, value, prize identifier or indicator, etc. For example, the outcome may be "television," "ten-thousand dollars," "cherry," "orange," "4," "PI-173068," etc. The outcomes of "television" and "ten-thousand dollars" indicate specific prizes for the outcomes. The outcomes of "cherry" and "orange" indicate a specific outcome, but not specific prize or benefit associated with the outcome. The controller 52, an intermediary, or other device or entity may then associate prizes or benefits to these outcomes at a later time and the associated prizes and benefits may vary. For example, on one day an outcome of "cherry" may be associated with a prize of "ten dollars" while on the next day an outcome of "cherry" may be associated with a prize of "one hundred dollars." The outcome of "PI-173068" provides a specific outcome identifier, but like the "cherry" and "orange" outcomes, the outcome identifier does not indicate a specific prize or benefit associated with the outcome, thereby allowing a specific prize or benefit for the outcome to be determined by another entity or device and to change over time if desired.

Other prizes or benefits that may be associated with an outcome include a warrantee for a product purchased in the past by a user, a warrantee for a product to be purchased in the future by a user, a discount off a purchase made in the future by a user, a charity donation, a scholarship, an unlock code for one or more outcomes, a password allowing access to or use of a software program, a password allowing access to a restricted World Wide Web site, a password allowed free access to a World Wide Web site, a multiplier of a outcome unlocked or a prize won by a user in the future, an extender of time during which an unlock code or outcome can be used, an extender of time during which a qualifying action can be initiated or completed, a free hair cut, a coupon, a coupon multiplier, a joke or other entertainment, a concert ticket, free or discounted legal services, a free or discounted apartment or car rental, free long distance telephone service, frequent shopper points, frequent flyer miles, a free movie rental, a sample of music or video, a game, a piece of a puzzle, all or part of a treasure map or game piece, etc.

A prize or benefit associated with an outcome may be merchant specific. Thus, in some embodiments, certain outcomes may only be unlocked by unlocked codes from a designated intermediary. In other embodiments, the prize associated with the outcome may be useable only at a specific merchant or with a promotion sponsored by a specific intermediary.

A prize or benefit associated with an outcome may also vary depending on the user that unlocks the outcome. For example, an unlocked outcome may provide a user with a prize of ten dollars if the prize is redeemed on the user's next birthday and five dollars any other day. A prize or benefit may also vary depending on a user's purchasing history at an intermediary (e.g., a new customer of an intermediary may receive a higher valued prize), status, credit card rating, demographic information (e.g., a prize awarded to a woman might be a gift certificate to a women's clothing store while a prize awarded to a man might be a gift certificate to a men's clothing store). A prize or benefit may also be scalable. Thus, for example, a prize may entitle a person to ten dollars off their next purchase of product if the product has a price between fifty and one hundred dollars and to twenty dollars off if the product has a price greater than one hundred dollars.

A prize or benefit may also allow a user to continue to play a game the user is playing on a user device, progress or change the game the user is playing on the user device, or come to an end of the game the user is playing on the user device. For example, a user playing a roulette wheel game on a user device may use an unlocked outcome to stop the roulette wheel from spinning. A user playing a car racing game on a user device may use an unlocked outcome to progress the race or to determine a winner of the race.

A prize or benefit associated with an outcome may have multiple aspects to it. For example, an unlocked outcome may entitle a user to five dollars now or fifty dollars if the user completes another qualifying action. As another example, an unlocked outcome may entitle a user to five dollars or provide one-half of a set of outcomes that entitle the user to a new car if the user can find the corresponding outcome in the set. In a further example, an unlocked outcome may be worth five dollars for a user that unlocks the outcome or fifty dollars if the user finds another user that has the same outcome and both users unlock their outcomes simultaneously or in conjunction with each other.

In some embodiments, an outcome or an unlock code may have a termination or expiration date associated with it, after which the outcome can no longer be unlocked, revealed, redeemed, etc. Expiration dates for outcomes or unlock codes may be used to create a sense of urgency or immediacy in a promotion. In addition, in embodiments where only one copy of each unique outcome may be available at any one time, expiring or terminating the outcome allows the controller 52 to associate a new unlock code or benefit to the outcome and/or to distribute the outcome to another user or intermediary. Similarly, expiring or terminating the outcome also allows a merchant or intermediary device to change a qualifying action or criterion associated with an outcome.

Each outcome determined or generated during the step 102 preferably is "locked" in that the symbol, value, prize identifier or indicator, etc., associated with the outcome is not revealed or otherwise discernible to a user without an unlock code. Thus, a user, user device or other entity or device cannot reveal or otherwise "unlock" the outcome without also having an unlock code associated with the outcome or capable of unlocking the outcome.

The controller 52 may lock the outcome by encrypting the outcome, such as by encrypting the outcome using a symmetric encryption algorithm. The encrypting key becomes the unlock code for the outcome. Other forms of encryption are also possible. With public key type encryption, outcomes may be locked with a public key and unlocked with a private key. The controller 52 may also encode the outcomes generated or otherwise determined during the 102. For example, the controller 52 may convert outcomes into universal product codes. As a further alternative, the controller 52 may provide a flag along with an outcome, the flag indicating whether or not a user device can display the outcome to a user. For example, an outcome generated during the step 102 and later provided to a user or user device during the step 104 may have an associated flag bit. The flag bit having a value of either "1" or "0." If the flag bit is "1," then a program contained on the user device will prevent the user from seeing the outcome or otherwise prevent the user device from displaying or outputting the outcome to the user. Only when the flag bit is "0" will the user device reveal or display the outcome. The user may have to satisfy or complete a qualifying action or criteria in order to be able to change the flag bit from "1" to "0." Further information on public key and other forms of encryption can be found in Bruce Schneier, Applied Cryptography, Second Edition, 1996, published by John Wiley & Sons, Inc.

In some embodiments, a user identifier may be used to generate and/or lock an outcome. An unlock code that is generated without using the same user identifier presumably will not be able to unlock the outcome. Thus, a specific and unique unlock code can be generated for an outcome, and both may be associated with a particular user. The user may have to provide the user identifier prior to receiving an outcome, so that the outcome can be generated using the user identifier, and prior to receiving an unlock code, so that the unlock code can be generated using the user identifier. In other embodiments, a user device identifier or other type of identifier may be used to generate an outcome and an associated unlock code in order to make the outcome and unlock code unusable with any device other than the specific user device associated with the user device identifier. Thus, the outcome and/or the unlock code become associated with the specific user device.

In some embodiments, one or more of the outcomes generated during the step 102 may be stored in an outcome database maintained, populated, controlled, and/or accessed on, by or for the controller 52. The outcome database also may be accessible and usable by an intermediary device and/or a user device, as will be discussed in further detail below. The controller 52 may assign or associate an alphanumeric identifier to an outcome generated by the controller 52 during the step 102. The identifier may also be stored in the outcome database for use by the controller 52, an intermediary device, a user device or other entity or device. In embodiments where outcomes are displayed on or downloadable from a World Wide Web site or page, the Uniform Resource Locator (URL) for the World Wide Web site or page or the Internet Protocol (IP) address for the server, controller or host computer associated with the World Wide Web site or page also may be recorded or stored in the outcome database. The outcome database may also include a user identifier for a user who receives, unlocks and/or redeems an outcome, an intermediary identifier for an intermediary that provides an unlock for the outcome to a user, a benefit or other payout associated with the outcome, a benefit or payment identifier for the benefit or other payout associated with the outcome, etc.

During the step 102, the controller 52 may also generate one or more unlock codes for each outcome generated during the step 102. The "generation" of unlock codes and outcomes will also be considered as including the identification, creation, determination, ascertainment, selection, obtainment, reservation, etc. of such unlock codes and outcomes.

Like the outcomes, the unlock codes may be stored in an outcome database maintained, populated, controlled, and/or accessed on, by or for the controller 52. In general, an unlock code will enable a user to unlock, detect or otherwise reveal at least one outcome such that a user or user device or other entity or device in possession of both an outcome and an unlock code will be able to use the unlock code to reveal, detect, etc. a prize, benefit, "symbol," "value" or other payout (e.g., "television," "ten-thousand dollars," "cherry," "orange," "4," "PI-173068") associated with the outcome or otherwise "unlock" the outcome. While the generation or other creation or identification of outcomes and the generation of unlock codes are discussed herein as being completed during the step 102, the generation or other creation or identification of outcomes may be done in a different step or at a different time or location from the generation or other creation or identification of unlock codes.

In some embodiments, a one to one relationship may exist between unlock codes and outcomes. That is, a single code will unlock one and only one outcome. In other embodiments, there may be a one to many relationship such that a single code will unlock multiple outcomes, a many to one relationship such that multiple codes will each unlock the same one and only one outcome, or a many to many relationship such that a code will unlock multiple outcomes and an outcome can be unlocked by multiple codes. Unlock codes may be reusable or not reusable, depending on the particular implementation of the present invention. Thus, even if a code may unlock any outcomes in a group of outcomes, the code might not be able to unlock a second outcome after the code is used to unlock a first outcome.

If an outcome is encrypted, the controller 52 may generate one or more keys for an encryption algorithm used to encrypt the outcome and designate as a code associated with the outcome one or more keys capable of decrypting the outcome. Alternatively, if an outcome is encrypted, the controller 52 may designate or identify as a code the algorithm used for decoding the outcome.

An outcome may have information or instructions associated with it. The combination of an outcome and the associated information or instructions will be referred to herein as a "ticket." For example, associated information for an outcome might include a promotional message sent to all users, such as "Pandelunba Airlines is the way to fly," or a personal message to a specific user, such as "Happy Birthday!" The associated information may include instructions for a user device, such as when, how, or under what circumstances the user device is to display an instructional, promotional or other message. For example, associated instructions sent along with an outcome to a user device might instruct the user device to display a promotional message for five minutes, on the hour, every other hour, etc. If the user device includes a Global Positioning System (GPS) sensor or detector, the associated instructions may instruct the user device to display a promotion when the user device is in or near a certain geographic location. The associated information may also include details as to when an outcome or group of outcomes will expire or can no longer be unlocked or redeemed.

The associated information may also include instructions for a user. An instructional message associated with an outcome may inform a user how to obtain a code that will unlock the outcome. For example, an instructional message may indicate "go to Sepefoma's department store to obtain an unlock code" when displayed on a user device. In this example, the associated information for the outcome forms some or all of a qualifying action or criterion that must be completed or satisfied by a user before the user will receive an unlock code for the outcome.

There are many ways or techniques by which the controller 52 can generate or identify an outcome during the step 102. For example, the controller 52 can use the output of a random number generator to choose from a numbered list of possible outcomes, e.g., a random output of "0917" from the random number generator picks the $917^{th}$ outcome from the list of possible outcomes.

The output of a random number generator may be associated with a benefit according to a predefined table. For example, a random number generator output of "0101" may be associated with a benefit of one dollar. The benefit may be or include money, frequent flyer miles, long distance telephone calling time, web currency, etc. The table may be configured to favor certain benefits. For example, nine of ten possible outputs of the random number generator may be associated with a benefit of zero dollars, whereas only one of the ten outputs of the random number generator is associated with a benefit of ten dollars.

The selection of which benefit to associate with which outcome may be based on any number of factors, including demographic information or other characteristics of a user unlocking the outcome, the location of a user or user device unlocking the outcome or providing a redemption request, the location of a performance of a qualifying action used to gain access to an unlock code to unlock the outcome or to receive the outcome, intermediary information (e.g., size, location, type of products or services sold, etc.), information relating to other unlocked outcomes (e.g., the total prize value already awarded to unlocked outcomes), etc.

The controller 52 may also identify outcomes by taking the outcomes in order from a predefined list, the list being created by the controller 52 or some other entity or device. Similarly, the outcomes that the controller 52 can use or select from may be received from outside sources, including intermediary parties, merchants and retailers, etc.

In some embodiments, the controller 52 may generate additions or subtractions to existing outcomes or lists of outcomes. The outcomes may be undistributed and in the possession of the controller 52, or the outcomes may be distributed and in the possession of a user. For example, the controller 52 may decide to add a promise or prize of ten dollars to an outcome in a user's possession, and may then communicate to the user, "That outcome you have is now worth an additional ten dollars when you unlock it." The communicated message becomes part of the associated information for the outcome.

The benefits or prizes associated with outcomes may not be predetermined by the controller 52. Thus, the controller 52 may generate parameters for generating an outcome, rather than generating the outcome itself. For example, the controller 52 may generate parameters whereby a user will receive five dollars ninety percent of the time, and fifteen dollars ten percent of the time, when the user unlocks an outcome. When the user later unlocks the outcome with a user device, the user device operates an internal random number generator and determines a benefit for the user in accordance with the given parameters for the outcome. The parameters described by the controller 52 may include provisions for a biometric or other input from the user. Thus, the user may be allowed to input a seed for the random number generator deciding the benefit. In addition, biometric information from a user may be used to generate an outcome and/or an unlock code so that the outcome and/or unlock code may be used only with or by the specific user. Biometric information for one or more users may be stored in a user database for use by the controller 52 or other devices.

During the step 104, the controller 52 may provide one or more of the locked outcomes generated during the step 102 to one or more users or user devices. The controller 52 may also provide the outcomes to an intermediary. Some users may get a large number of locked outcomes while other users may get only one or a small number of locked outcomes. The locked outcomes may be received by and stored on a user device, such as a personal digital assistant, laptop computer, cellular telephone, etc. The controller 52 may record or indicate which users received outcomes or which users received which specific outcomes in the outcome database. In order to send an outcome to a user, the controller 52 may have to select or identify a user and determine or identify the number of outcomes to send or transfer to that user or the user's user device. The controller 52 may also provide or send associated information or instructions to the user along with the locked outcome, such that the user receives a ticket from the controller 52.

The controller 52 can identify a user in many ways. For example, a user may register with the controller 52 by submitting a name, address, user device identifier, or other pertinent information. A user may request or agree to receive outcomes. Alternatively, a third party, such as a merchant or other intermediary, may ask or instruct the controller 52 to provide outcomes to a specific user or ask a user to agree to receive one or more outcomes.

A user may qualify to receive outcomes based on a test or other criteria established or agreed to by the controller 52. For example, all users having or meeting a certain demographic profile may be eligible to receive or download one or more outcomes. A user may have to meet certain criteria in order to receive outcomes. The criteria may include, for example, that the user currently has no outcomes, the user has an insufficient number of outcomes, the user has redeemed an outcome that allows or entitles the user to receive additional outcomes, the user has a particular shopping history, family size, survey response history, credit limit, etc. In some embodiments, a user may log on to or access the controller 52 and request outcomes and the user may or may not have to pay to receive outcomes.

There are also many ways in which the controller 52 can determine how many outcomes to provide or transfer to a user or user device. For example, the controller 52 may provide to a user as many outcomes as possible, a single outcome, as many outcomes that the controller 52 currently has generated, as many outcomes as a user device can store or hold, as many outcomes as the user has paid for, as many outcomes for which a third party has paid for on behalf of the user, the number of outcomes the user has requested, a standard or fixed (e.g., one hundred, ten, etc.) number of outcomes, a random number of outcomes, the number of outcomes that the controller 52 anticipates or determines the user will redeem, use or unlock in a given period of time, a number of outcomes determined in accordance with external factors (e.g., the number of outcomes provided is dependent on the time of day, day of the week, the current weather, the level of a stock price, etc.), or a number of outcomes based on user characteristics or demographic profile. The number of outcomes may also be based on the location of a user or user device, which may be determined by a Global Positioning System (GPS) or other tracking device, sensor, detector, etc. associated with, carried by, or included in the user or user device.

The controller 52 may also provide or transfer an outcome to a user or user device depending on the outcome's perishability. For example, if one hundred outcomes are about to expire or terminate, the controller 52 may provide all one hundred outcomes to a user during the step 104. Alternatively, the controller 52 may provide or transfer a number of outcomes to a user or user device in accordance with a number of codes that the controller 52 has or will dispense. For example, if the controller 52 has previously provided or transferred one thousand more codes than outcomes, the controller 52 might provide or transfer one thousand new outcomes.

The controller 52 may send or transmit outcomes to a user or user device electronically, such as via email, cellular telephone call, or other means using the communications network 58. A user may also access the controller 52 remotely with a user device, such as the user device 54, and download or otherwise retrieve one or more outcomes from the controller 52 for storage on the user device. The user device preferably allows for storage and retrieval of multiple outcomes and codes, as will be discussed in further detail below. The controller 52 may also mail or send outcomes to a user on a floppy disk CD-ROM, DVD or other electronic storage medium. The user can then load one or more of the outcomes stored on the storage medium to a user device and store them on the user device. As another alternative, the controller 52 may mail a user device to a user, or otherwise arrange for a user device to be mailed to a user, the user device having one or more outcomes previously stored on it. In other embodiments, the controller 52 may designate a set of outcomes as belonging to, or being associated with, a specific user. The controller 52 may then allow the user to access the designated set of outcomes by providing an account number or password. For example, users may view, retrieve or download outcomes from a password secured World Wide Web site or page or a bulletin board.

In some embodiments, the step 104 may be completed after the step 106. In other embodiments, the step 104 may be completed immediately after the locked outcomes are generated or identified during the step 102 and before the generation of the unlock codes during the step 102.

During the step 106, the controller 52 provides one or more of the unlock codes generated during the step 102 to one or more intermediaries or intermediary devices. Like outcomes, unlock codes may carry or be associated with information or instructions. In some embodiments, an intermediary may have to provide payment prior to or after receiving a code.

Also, an intermediary, or a third party on behalf of the intermediary, may have to request to receive codes or agree to receive codes.

An intermediary may have to meet certain criteria or fit a certain profile in order to be eligible to receive an unlock code from the controller 52. For example, the intermediary may have had to run out of previously supplied codes, the intermediary may have to have a number of codes that is lower than some predetermined number, the intermediary may have to be located in a certain location or area, the intermediary may have to have a particular employee, customer or other demographic composition, address, customer transaction history, company or store size or location, survey response history, etc.

The controller 52 may send or transmit codes to an intermediary or intermediary device electronically, such as via email, cellular telephone call, or other means using the communications network 58. Likewise, the controller 52 may mail or send a floppy disk, CD-ROM, DVD or other storage medium containing one or more codes to one or more intermediaries. The intermediary can then load one or more of the codes stored on the storage medium to an intermediary device and store them on the intermediary device. As another alternative, the controller 52 may mail or provide an intermediary device to an intermediary, or otherwise arrange for an intermediary device to be mailed or provided to an intermediary, the intermediary device having one or more codes previously stored on it. In other embodiments, the controller 52 may designate a set of unlock codes as belonging to, or being associated with, a specific intermediary. The controller 52 may then allow the intermediary to access the designated set of unlock codes by providing an account number or password. For example, intermediaries may view, retrieve, download, access, etc. unlock codes from a password secured World Wide Web site or page, bulletin board, etc.

An intermediary may also access the controller 52 remotely with an intermediary device, such as the intermediary device 56, and download or otherwise retrieve one or more codes from the controller 52 for storage on the intermediary device. The intermediary device preferably allows for storage and retrieval of multiple outcomes and codes, as will be discussed in further detail below. In order to send an outcome code to an intermediary, the controller 52 may have to select or identify an intermediary and determine or identify the number of outcomes to send or transfer to that intermediary or an intermediary device associated with or controlled by the intermediary.

The controller 52 may have to determine, identify or agree to a number of unlock codes to be transferred or provided to an intermediary during the step 104. For example, the controller 52 may transfer or provide to an intermediary as many codes as possible, a single code, as many codes that the controller 52 currently has generated, as many codes as an intermediary device can store, hold or unlock, as many codes as the intermediary has paid for, as many codes for which a third party has paid for on behalf of the intermediary, the number of codes the intermediary has requested, a standard or fixed (e.g., one hundred, ten, etc.) number of codes, a random number of codes, the number of codes that the controller 52 anticipates or determines the intermediary will use in a given period of time, a number of codes determined in accordance with external factors (e.g., the number of codes provided is dependent on the time of day, day of the week, the current weather, the level of a stock price, etc.), a number of codes based on a supplied user identifier, user device identifier or other identifier, or a number of codes based on intermediary characteristics or profile.

The number of unlock codes may also be based on the location of the intermediary, which may be determined by a Global Positioning System (GPS) or other tracking device, sensor, detector, etc. associated with or included in the intermediary or intermediary device.

The controller 52 may also provide or transfer a code to an intermediary or intermediary device depending on the code's perishability. For example, if one hundred codes are about to expire or terminate, the controller 52 may provide all one hundred codes to an intermediary during the step 106. Alternatively, the controller 52 may provide or transfer a number of codes to an intermediary or intermediary device in accordance with a number of outcomes that the controller 52 has or will dispense. For example, if the controller 52 has previously provided or transferred one thousand more outcomes than codes, the controller 52 might provide or transfer one thousand new codes.

In embodiments where an intermediary pays for receiving or downloading codes, payment may be based on the number of codes that the intermediary receives, or the value or expected value of any prize or benefit associated with an outcome unlocked by a code provided to the intermediary. Payment amounts for codes may vary depending on intermediary participation or satisfaction levels, user participation or satisfaction levels, etc. For example, in an implementation where a user pays to receive unlock codes, an amount a user may pay for unlock codes may depend on the number of users participating in a promotion, the number of merchants or other intermediaries participating in a promotion, the degree to which a merchant's participation in a promotion increases sales of products or services involved in the promotion, user feedback regarding participation in a promotion, etc.

In some embodiments, the controller 52 may maintain, update or access an intermediary database in which addresses, contact information, email addresses, names, etc., for one or more intermediaries are stored or recorded. The controller 52 may record in the intermediary database information regarding which codes have been sent or provided to which intermediary.

Each intermediary to which the controller 52 sends an unlock code may have a unique identifier associated with it. The controller 52 may store unique identifiers and other intermediary information in the intermediary database. In addition, the controller 52 may store information, code identifiers, etc., for some or all of the codes sent to the intermediary by the controller 52 during the step 106. In embodiments where codes are displayed on or downloadable from a World Wide Web site or page, the Uniform Resource Locator (URL) for the World Wide Web site or page or the Internet Protocol (IP) address for the server, controller or host computer associated with the World Wide Web site or page also may be recorded or stored in the intermediary database.

In some embodiments, the step 106 may be completed before the step 104. In addition, the step 106 may be completed immediately after the generation or identification of unlock codes during the step 102.

After the controller 52 provides an outcome to a user or user device during the step 104 and a code that unlocks the outcome to an intermediary or intermediary device during the step 106, the controller 52 may wait to receive the code or other redemption request back from the user or an intermediary during the step 108. Note that the step 108 may not be used or needed in all embodiments of the present invention. The user presumably will have received the code from the intermediary and unlocked the outcome so that that the user can view or discern the prize, benefit, value, symbol, etc., associated with the outcome. As previously discussed above, the user also presumably had to complete or satisfy a qualifying criteria or action to receive a code from an intermediary. Further discussion and explanation of how a user might receive from an intermediary an unlock code for an outcome will be provided below.

During the step 108, the controller 52 receives a redemption request from a user. The redemption request may be sent by a user to the controller 52 via mail, wire transfer, facsimile, telephone, email or other electronic transmission, etc.

The redemption request received by the controller 52 during the step 108 may include or constitute a code used to unlock an outcome, a request to receive any or all of a benefit or prize associated with an outcome unlocked by the user, an outcome unlocked by user with the code and any flags, information or instructions associated with the outcome, the date and/or time at which the user received the code, the date and/or time at which the user unlocked an outcome with the code, an intermediary identifier for the intermediary from which the user received a code, description of any qualifying criteria or action the user had to complete or satisfy in order to receive a code, proof, verification or authentication that the user has completed or satisfied any qualifying criteria or action associated with an outcome, an indication of a prize or benefit that the user would like to receive or redeem, a user identifier or other user identifying information, a user device identifier, serial number or other user device identifying information, user security information (e.g., the user may send a password, voice biometric, photograph, etc., to the controller 52 that enables a user to access an account the user has with the controller 52), etc.

In some embodiments, the controller 52 may receive a redemption request from a merchant instead of a user during the step 108. For example, a user may obtain a prize from a merchant. The merchant then submits a redemption request to the controller 52 in order to recoup some or all of the value of the prize provided by the merchant to the user.

During either the step 108 or the step 110, the controller 52 may verify an outcome. That is, the controller 52 may verify that a user trying to redeem an outcome by providing a redemption request received by the controller 52 during the step 108 is the user to whom the outcome was sent by the controller 52 during the step 104. The controller 52 may look up the outcome submitted by the user, or the outcome associated with the redemption request received by the controller 52 during the step 108, in an outcome database and check that the identifying information provided in the redemption request matches identifying information of the user to whom the outcome was originally provided by the controller 52 during the step 104. A user password or account number provided in a redemption request may also serve as identifying information if the controller 52 has given the password or account number only to a particular user.

Another verification of an outcome that can be conducted by the controller 52 is a verification that the outcome was unlocked properly. The controller 52 may compare a user code submitted as part of a redemption request to the code provided in a database of the codes generated or identified by the controller 52 during the step 102. The controller 52 may also query an intermediary or the user to ascertain whether or not the user received the code properly from the intermediary.

The controller 52 may also verify that the value, symbol, benefit or prize associated with the outcome for which the redemption request is received during the step 108 is the same value, symbol, benefit or prize associated with the outcome when the outcome was originally generated by the controller 52 during the step 102 or originally provided to a user during the step 104.

The controller 52 may also verify that any qualifying actions or criteria associated with an outcome by the controller 52 or an intermediary have been satisfied or completed by the user from whom the redemption request is received during the step 108. The controller 52 may query an intermediary or the user to ascertain whether or not such qualifying criteria or action was properly satisfied or completed. Similarly, the controller 52 may determine that the outcome has not been terminated or otherwise perished or expired.

If a user submits multiple redemption requests or outcomes for redemption, the controller 52 may check to see if the user unlocked multiple outcomes within an unreasonably or impossibly short period of time. For example, it may be physically impossible for a user to complete all of the required behaviors or qualifying actions for multiple outcomes in a short period of time. Thus, if a user unlocked a large number of outcomes in a short period of time, the controller 52 may assume that the user has acted improperly somehow.

During the step 110, the controller 52 may redeem an outcome or otherwise provide a benefit or other payout associated with the outcome for which a redemption request was received by the controller 52 during the step 108. The step 110 may also be completed by the controller 52 providing an indication of the benefit or other payout. In some embodiments, the controller 52 may access an outcome database to determine if a specific benefit has been associated with a particular outcome and/or what the benefit is.

In some embodiments, a prize or benefit may be associated with the outcome generated during the step 102 before the outcome is generated, before the indication of the outcome is sent during the step 104, etc. In other embodiments, the prize or benefit associated with an outcome may not be determined until the outcome is unlocked, after a redemption request for the outcome is received, after a qualifying action is performed, etc.

The controller 52 may compensate or provide a benefit to a user in a variety of ways. For example, the controller 52 may mail cash, a check, coupons, products, gift certificates, etc., to a user, the controller 52 may transfer or wire a benefit electronically to a user, the controller 52 may place or post a benefit where the user may obtain it (e.g., the controller 52 may post digital cash to a World Wide Web site where the user may claim or download it), the controller 52 may arrange for a third party to mail, transfer or provide a benefit to the user, the controller 52 may settle a user's payment for a product of service with a third party (e.g., the controller 52 arranges with AT&T Corporation to pay the user's long distance phone bill), the controller 52 may procure or arrange a free or discounted service for a user (e.g., the controller 52 may arrange for a professional golf player to give the user a free golf lesson), the controller 52 may publicize a user's name, the controller 52 may provide or arrange for the provision of a benefit to a user designated charity or other third party, etc.

In some embodiments, a benefit associated with an outcome may change or decrease over time during a promotion, thereby motivating users to unlock the outcome sooner rather than later. In addition, such an embodiment may encourage intermediaries to provide unlock codes for outcomes in an expedited manner or to change qualifying actions associated with outcomes or unlock codes.

In some embodiments, a benefit associated with an outcome may be selected or varied depending on a location of an intermediary, intermediary device, user, user device, the controller 52, etc. associated with the outcome, associated with an unlock code used to unlock the outcome, associated with a qualifying action completed to enable access to the unlock code used to unlock the outcome, etc.

After an outcome is redeemed or provided to a user, the controller 52 may update an outcome database to reflect or record that the outcome has been redeemed. The controller 52 may also include information in the outcome database regarding which unlock code the user used to unlock the outcome, which intermediary provided the unlock code to the user, what qualifying action, if any, is associated with the outcome, etc.

Figure 3:
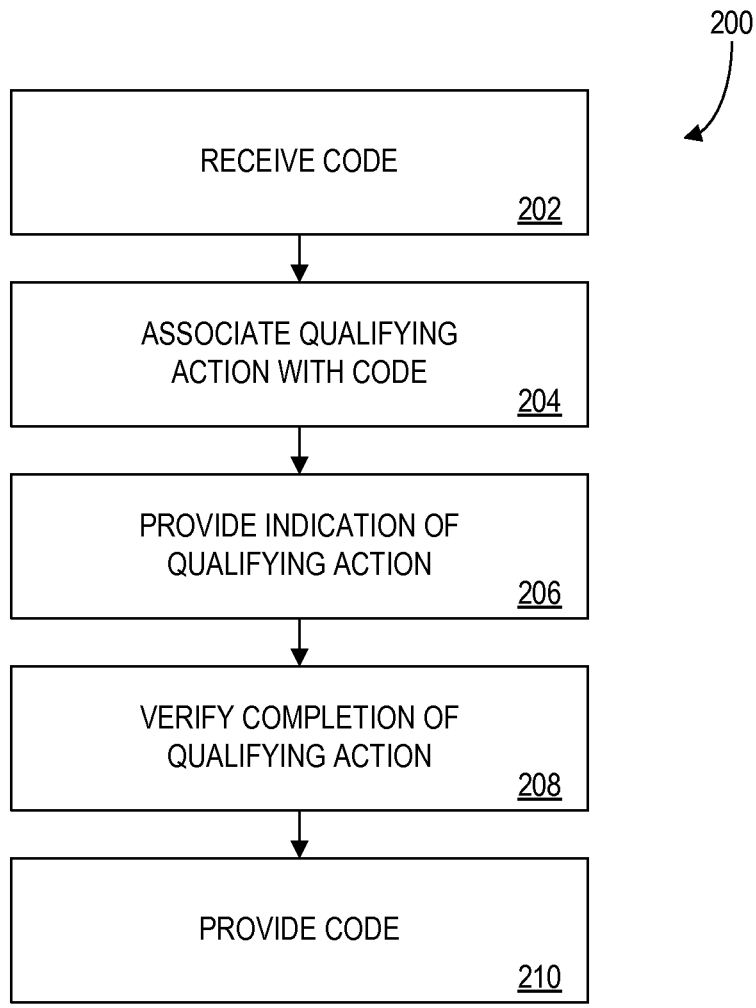
FIG. 3 is a flowchart of a method in accordance with the present invention as conducted by the intermediary device of FIG. 1.

As previously discussed above, in some embodiments, the method of the present invention involves operation or activity by a controller or other central source, such as the controller 52, an intermediary device located at a merchant, such as the intermediary device 56, and a user device, such as the user device 54. The method 100 previously discussed above dealt primarily with activities of the controller 52. Now referring to FIG. 3, a method 200 in accordance with the principles of the present invention is illustrated as may performed or completed by an intermediary or intermediary device, such as the intermediary device 56. In general, the intermediary or intermediary device will perform or complete all of the method 200. However, some or all of the steps of the method 200 may be completed by the controller 52 and/or the user device 54.

The method 200 includes a step 202 during which an intermediary or intermediary device receives one or more codes directly or indirectly from the controller 52, a step 204 during which the intermediary or intermediary device associates one or more qualifying actions or criteria to one or more codes received from the controller 52 during the step 204, a step 206 during which the qualifying actions or criteria established during the step 204 are provided or indicated by the intermediary or intermediary device to a user or user device, a step 208 during which the intermediary or intermediary device verifies or determines if the user has completed or satisfied the designated qualifying actions or criteria, and a step 210 during which the intermediary or intermediary device provides at least one code to the user, or associated user device, who completed the qualifying action or criteria, the code being one of the codes received by the intermediary or intermediary device from the controller 52 during the step 202.

The step 202 for the intermediary or intermediary device is complementary to the step 106 for the controller 52. That is, the unlock codes provided by the controller 52 during the step 106 are received by the intermediary or intermediary device during the step 202. A code received by the intermediary or intermediary device during the step 202 may have associated information or instructions or comprise part of a ticket, as previously discussed above.

During the step 204, the intermediary or intermediary device defines or associates qualifying criteria or a qualifying action for a code that a user must complete or satisfy before the intermediary will provide a code to the user during the step 210. There can be many kinds of qualifying criteria or qualifying actions that a user may have to complete. For example, the user might have to fill out a survey. Filling out the survey might entail releasing private information, such as the user's demographic data or profile. To meet intermediary criteria, the survey might have to pass accuracy tests administered by the intermediary or intermediary device or other entity or device. For example, the intermediary device 56 might verify that answers to similar questions are consistent.

As other examples of qualifying criteria or qualifying actions, the user might have to stand in line at a checkout counter, customer service counter, or at some other area for a period of time, the user might have to visit a particular location, merchant, store area, etc., the user might have to view, listen to, or otherwise perceive certain content (e.g., the user may be required to view an advertisement), the user might have to achieve a certain performance level at a game or other test of skill or predominant skill (e.g., a cashier may have to deliver and conduct a sales transaction properly, or a pilot might have to take off or navigate successfully in a flight simulation), the user might have to achieve a certain performance level at a game of luck or predominant luck, the user might have to teach or coax another into achieving a certain performance level at a game or test of skill (e.g., the user might have to teach a child to spell twenty words correctly), the user may have to utter a particular phrase (e.g., the user may have to say "Coke rules" three times in a day), the user might have to wait on hold on the phone for a period of time, the user might have to commit to an action (e.g., the user agrees to buy a specific product in the next three days), the user might have to pay the intermediary or some other party, the user might have to make a purchase of products or services from the intermediary or from some other party, the user might have to convince others to make a purchase of a specific product or at a specific merchant, the user might have to interact with one or more third parties in the performance of some behavior or the achievement of some goal, the user might have to perform any one or more of the other described behaviors within a particular time frame, etc. A qualifying action may also be based on an external or unpredictable event. For example, a qualifying action may be based on a designated professional baseball team winning its next game.

After the intermediary or intermediary device has determined or identified the qualifying actions or criteria for receiving a code during the step 204, during the step 206 the intermediary or intermediary device will provide or indicate the qualifying actions or criteria to a user or user device. The intermediary or intermediary device may also provide an indication of the qualifying action to the controller 52. The intermediary or intermediary device may provide indications of the qualifying actions or criteria in many ways, such as through announcements or advertisements on billboards, signs, television, radio, telephone, email, public address systems, speakers, the World Wide Web, and the Internet, as well as through direct mail advertisements. In some embodiments, the intermediary or intermediary device may transmit qualifying actions wirelessly to users walking by, through or near the intermediary, driving or otherwise passing by the intermediary, etc.

Qualifying criteria or actions may also be provided or listed in a product or on a product's packaging. For example, a message in a cereal box might state: "send in the UPC label for this box and receive an unlock code in the mail."

Salesmen or other representatives or employees of an intermediary may communicate the qualifying criteria or actions to a user. Alternatively, a salesman may travel to the user's address, or may communicate to the user at the location of the intermediary.

An intermediary may communicate qualifying actions or criteria to a user through a third party. For example, the intermediary may provide qualifying information to a friend of the user, who then provides the user with the intermediary's qualifying criteria.

A user device may be programmed to communicate qualifying criteria to a user. For example, a merchant or other intermediary may sell or pass out user devices to users. The user devices periodically display "make a purchase today to receive a code and unlock an outcome." In some embodiments, an unlock code, when loaded onto or stored on a user device, may cause the user device to display criteria for receiving additional unlock codes.

After the qualifying actions or criteria are provided by an intermediary to a user or user device during the step 206, the intermediary or intermediary device may verify that the qualifying actions or criteria have been satisfied or completed by the user during the step 208. The verification process may depend on the type and scope of qualifying action or criteria. In some embodiments, a user's satisfaction or completion of a qualifying action or criteria may be assumed unless the intermediary or intermediary device receives an indication that the user has not satisfied or completed the qualifying action or criteria. In other embodiments, the verification process during the step 206 may be considered to be totally or partially completed by the intermediary or intermediary device receiving a message or other indication of a willingness or agreement to complete the qualifying actions. Such message or other indication may come directly or indirectly from a user or a user device.

In some embodiments, a qualifying action associated with an outcome or unlock code may be modified, disabled or invalidated over time, thereby allowing the qualifying action to be based on external events, modified according to or based on the occurrence of an external event, etc.

In some embodiments, the verification step 208 may also include a three part analysis during which the intermediary or intermediary device receives indications, information or inputs of a user's behavior, the intermediary or intermediary device characterizes the user's behavior based on the indications, information or inputs, and then the intermediary or intermediary device compares the user's characterized behavior with specified qualifying criteria to determined if the user has completed or satisfied the qualifying criteria.

The intermediary or intermediary device may receive indications, information, inputs, etc., regarding a user's behavior in a variety of ways. For example, the intermediary or intermediary device may receive a keyword, code, etc., indicative of a user behavior, either from the user or some other party. The user might have received the keyword, code, etc., from a third party in exchange for completing an activity, such as watching a new product demonstration or commercial, playing a new game, testing a new product, answering a survey, etc. The intermediary may film, tape or otherwise record a user performing an activity or use other sensors of input devices to capture or ascertain aspects or characteristics of a user's behavior. Sensors may include weight sensors, touch sensors, touch screens, buttons, retinal scanners, heart monitors, finger print scanners, thermometers, infrared sensors, blood pressure sensors, skin conductivity sensors, breath analyzers, screens which record hand writing, and so on. The sensors may be part of an intermediary device, may be in communication with the intermediary device, or may be part of a user device.

A user may communicate or otherwise provide user behavior information to the intermediary or intermediary device. Alternatively, an employee or other representative of the intermediary or an intermediary device, or some other third party or device, may observe the user's behavior and communicate or provide observations regarding the user's behavior to the intermediary or intermediary device. Authenticating documentation may also be provided to the intermediary or intermediary device by the employee, representative, or other third party or device.

After receiving or determining the information, indications, or inputs regarding a user's behavior, the intermediary or intermediary device may interpret or characterize the user's behavior. In some situations no characterization of the user's behavior by the intermediary or an intermediary device will be necessary. For example, if an intermediary's representative has described a user behavior to an intermediary, presumably the representative has already interpreted the user's behavior or at least has provided some interpretative information regarding the user's behavior. For example, a representative might describe a user as reaching out and examining a can of soup in a grocery store. The representative may also describe or attempt to ascertain the user's interest level in the can of soup.

After a user's behavior is interpreted or characterized by the intermediary or intermediary device, the user's behavior can be compared against qualifying criteria or actions established by the intermediary or intermediary device during the step 204 to see if the user has satisfied or completed the qualifying criteria or actions. The intermediary device may maintain a database of qualifying actions against which to compare a user's characterized behavior to see or determine if the user has satisfied or completed any of the criteria.

During the step 210, if a user has completed or satisfied the qualifying criteria or code established for a code during the step 204, the intermediary or intermediary device may provide the code received during the step 202 to the user. The user can then use the code to unlock an outcome stored on a user device. There are many ways by which the intermediary or intermediary device can provide an unlock code to the user. For example, the intermediary device 56 can transfer an electronic unlock code over a wired or wireless electronic connection with a user device, the intermediary device 56, a representative of an intermediary can communicate the code to the user via phone, email message, telegraph, facsimile, cable modem or any other electronic means, the intermediary can mail the code to the user, or the intermediary device 56 can transfer the unlock code to a third party, such as a friend of the user, who then transfers the unlock code to the user. The intermediary device 56 or an intermediary's employee can also personally transfer or verbally communicate the code to the user or a user device. The code may be printed as text, a bar code, Braille, etc., or may be stored on machine-readable medium. In some embodiments, an intermediary or intermediary device may transmit an unlock code to a user or user device wirelessly as the user or user device is walking, driving or otherwise passing through, by or near an intermediary, Once the user has received a code, the user can unlock an outcome stored on a user device, as previously discussed above. There are many ways in which a user may unlock an outcome, as will be discussed in more detail below.

Figure 4:
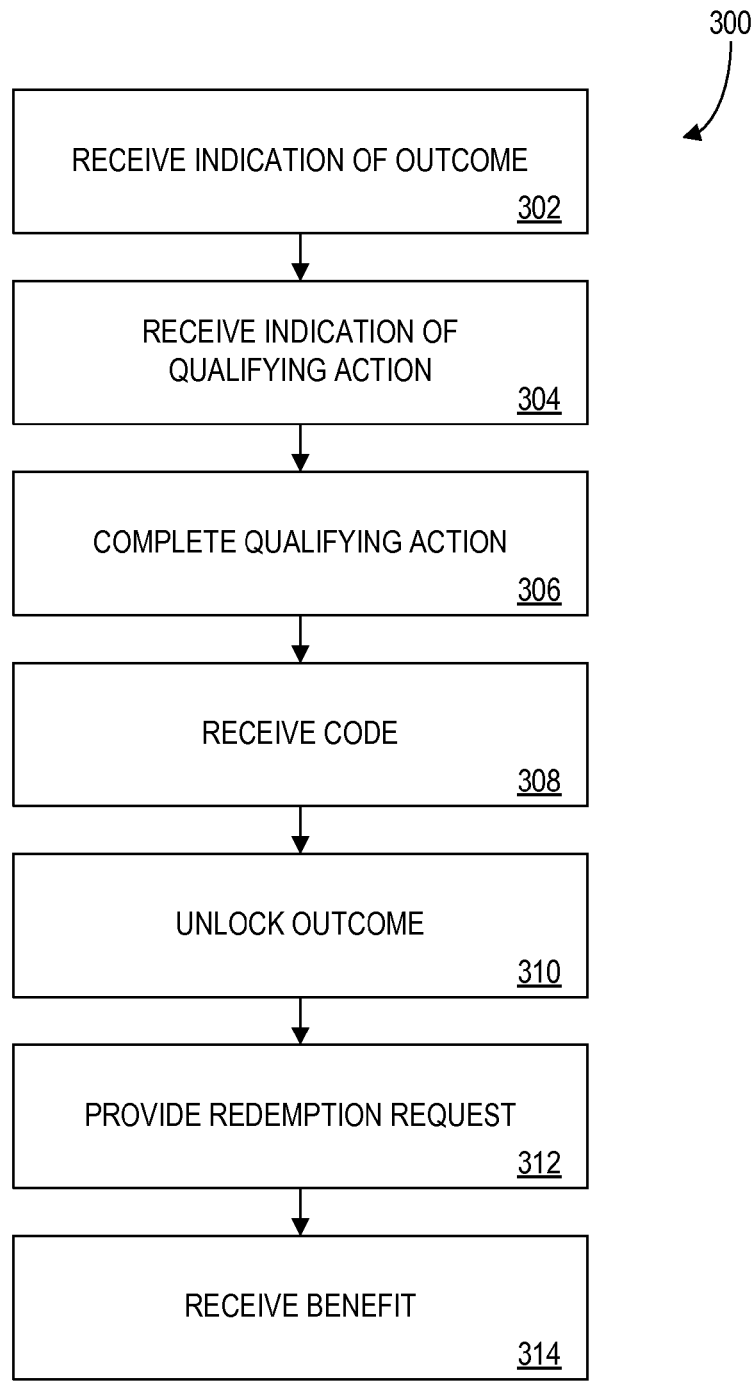
FIG. 4 is a flowchart of a method in accordance with the present invention as conducted by the user device of FIG. 1.

As previously discussed above, in some embodiments, the method of the present invention involves operation or activity by a controller or other central source, such as the controller 52, an intermediary device located at a merchant, such as the intermediary device 56, and a user device, such as the user device 54. Now referring to FIG. 4, a method 300 in accordance with the principles of the present invention as performed or completed by a user or a user device, such as the user device 54. In general, the user or a user device will perform or complete all of the method 300. However, some or all of the steps of the method 300 may be completed by the controller 52 and/or an intermediary device.

The method 300 includes a step 302 during which an indication of one or more outcomes is received by a user or user device from the controller 52, a step 304 during which an indication of a qualifying action or criteria is received by the user or user device from an intermediary or intermediary device, such as the intermediary device 56, a step 306 during which a user completes the qualifying action or criteria that entitles the user or user device to receive a code from the intermediary or intermediary device, a step 308 during which the user or user device receives a code from the intermediary or intermediary device, a step 310 during which the user or user device unlocks an outcome received from the controller 52 during the step 302, a step 312 during which the user or user device provides a redemption request to the controller 52, and a step 314 during which the user or user device receives a benefit or outcome associated with the outcome unlocked during the step 310 with the code received from the intermediary or intermediary device during the step 308.

During the step 302, the user or user device receives one or more outcomes from the controller 52. The step 302 for the user or user device is complementary to the step 104 for the controller 52. That is, the outcomes provided by the controller 52 during the step 104 are received by the user or user device during the step 302. An outcome received by the user or user device during the step 302 may have associated information or instructions or comprise part of a ticket, as previously discussed above.

During the step 304, the user or user device receives an indication of a qualifying action or criteria from an intermediary that, upon completion or satisfaction, will enable or authorize the user or user device to receive an unlock code from the intermediary that will unlock at least one of the outcomes that the user or user device received from the controller 52 during the step 302. The step 304 for the user or user device is complementary to the step 206 for the intermediary device 56. That is, the indication provided by the intermediary device 56 during the step 206 is received by the user or user device during the step 304. Note that in some embodiments, the controller 52 may provide an indication of a qualifying action directly to a user or user device. Therefore, in such embodiments, the user or user device will not receive the indication of the qualifying action or criteria from the intermediary or intermediary device during the step 304, but will instead receive it from the controller 52, as will be discussed in more detail below.

During the step 306, the user completes or satisfies the qualifying criteria or actions provided to the user or user device from an intermediary or intermediary device during the step 304. Upon completion or satisfaction of the qualifying criteria or actions, the user or user device or some other entity or device may provide a message or other indication to the intermediary or intermediary device that the user has completed or satisfied the qualifying criteria or action. Alternatively, in some embodiments, the user may provide an indication of a willingness or agreement to complete the qualifying action, which suffices to complete the step 306.

As previously discussed above, the intermediary or intermediary device may verify during the step 208 that the user has, in fact, completed or satisfied the qualifying criteria or action.

During the step 308, the user or user device receives one or more codes from the intermediary or intermediary device. The step 308 for the user or user device is complementary to the step 210 for the intermediary or intermediary device. That is, the code provided by the intermediary or intermediary device during the step 210 is received by the user or user device during the step 308. Note that in some embodiments, the controller 52 may provide an unlock code directly to a user or user device. Therefore, in such embodiments, the user or user device will not receive the unlock code from the intermediary or intermediary device during the step 308, but will instead receive it from the controller 52, as will be discussed in more detail below.

During the step 310, the user or user device uses the unlock code received from the intermediary or intermediary device during the step 308 to unlock one or more of the outcomes received from the controller 52 during the step 302. There are many ways in which a user or user device may unlock an outcome. For example, if the unlock code is a key associated with a decryption algorithm, then a user device may apply the algorithm to the key and to the outcome stored on the user device. If the unlock code describes an algorithm for decoding the encoded outcome, then the user or user device may employ the algorithm to decode the outcome. If the outcome is embodied with scratch-off technology, the user scratches off the space indicated by the code. If the outcomes is associated with code bits which tell the user device whether to reveal the outcome, then the user device searches its outcome database for outcomes that may be revealed with the obtained code. If multiple outcomes may be unlocked, the user device may pick one outcome at random, reveal that one, and then reveal no others. Alternatively, outcomes may be ordered in the user device, and the user device may pick the first of a plurality of potential outcomes to unlock according to some ordering scheme. If the unlock code is a key for unlocking a box or other physical contraption, then the user unlocks the contraption using the key. If the code is a combination for a combination lock to a box containing the outcome, then the user uses the combination to open the lock.

During the step 312, the user or user device provides a redemption request to the controller 52. The step 312 for the user or user device is complementary to the step 108 for the controller 52. That is, the redemption request provided by the user or user device during the step 312 is received by the controller 52 during the step 108. As previously discussed above, the redemption request may include or constitute the code used to unlock an outcome that is received by the user during the step 308, a request to receive any or all of a benefit or prize associated with an outcome received by the user from the controller 52 during the step 302 and unlocked by the user during the step 310, an outcome unlocked by user with the code and any flags, information or instructions associated with the outcome, the date and/or time at which the user received the code, the date and/or time at which the user unlocked an outcome with the code, an intermediary identifier for the intermediary from which the user received a code, description of any qualifying criteria or action the user had to complete or satisfy in order to receive a code, proof, verification or authentication that the user has completed or satisfied any qualifying criteria or action associated with an outcome, an indication of a prize or benefit that the user would like to receive or redeem, a user identifier or other use identifying information, a user device identifier, serial number or other user device identifying information, user security information (e.g., the user may send a password, voice biometric, photograph, etc., to the controller 52 that enables a user to access an account the user has with the controller 52), etc.

During the step 314, the user or user device receives an outcome or a benefit or prize associated with the outcome from the controller 52 or some other entity or intermediary associated with the controller 52, as previously discussed above. The step 318 for the user or user device is complementary to the step 110 for the controller 521. That is, the benefit provided by the controller 52 during the step 110 is received by the user or user device during the step 314.

Figure 5:
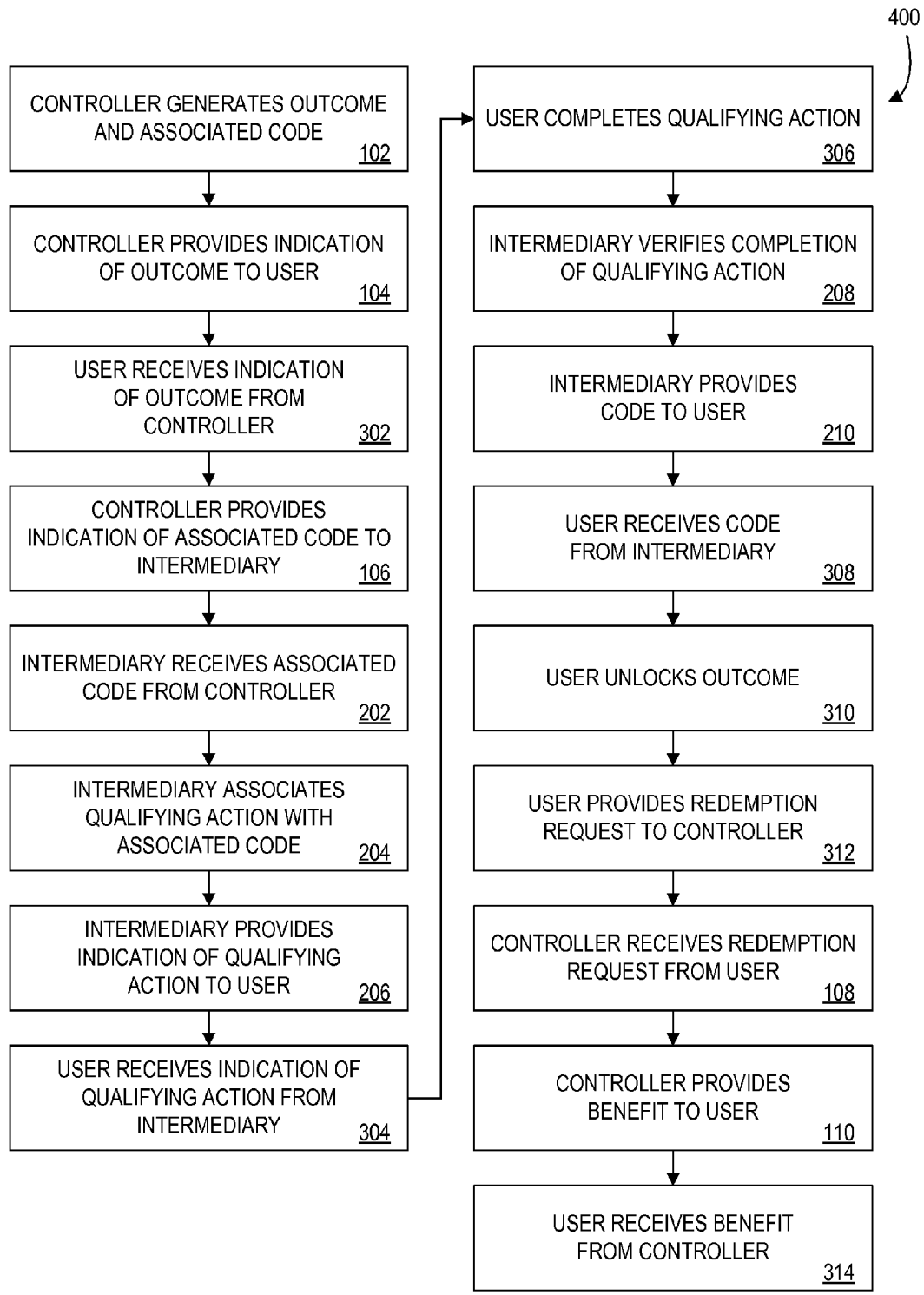
FIG. 5 is a flowchart of a method illustrating the combination of the flowcharts of FIGS. 2, 3 and 4.

Now referring to FIG. 5, a flowchart 400 is illustrated that shows the combined operation of the method 100 by the controller 52, the method 200 by the intermediary device 56, and the method 300 of the user 54. Thus, the method 400 shows the relationships of the steps 102, 104, 106, 108 and 110 of the method 100, the steps 202, 204, 206, 208 and 210 of the method 200, and the steps 302, 304, 306, 308, 310, 312 and 314 of the method 300.

While the steps of the method 400 are shown as proceeding in the following order: 102, 104, 302, 106, 202, 204, 206, 304, 306, 208, 210, 308, 310, 312, 108, 110 and 314, the steps may be performed in different orders. For example, the steps 106 and 202 may be initiated or completed before the step 104.

The steps 312, 108, 110 and 314 could be eliminated or changed such that the user provides a redemption request to an intermediary or other entity instead of the controller 52 during the step 312, thereby changing the step 108 accordingly. In addition, the intermediary or other entity could provide a benefit to the user during the step 110 instead of the controller 52, thereby also changing the step 314 accordingly.

Figure 6:
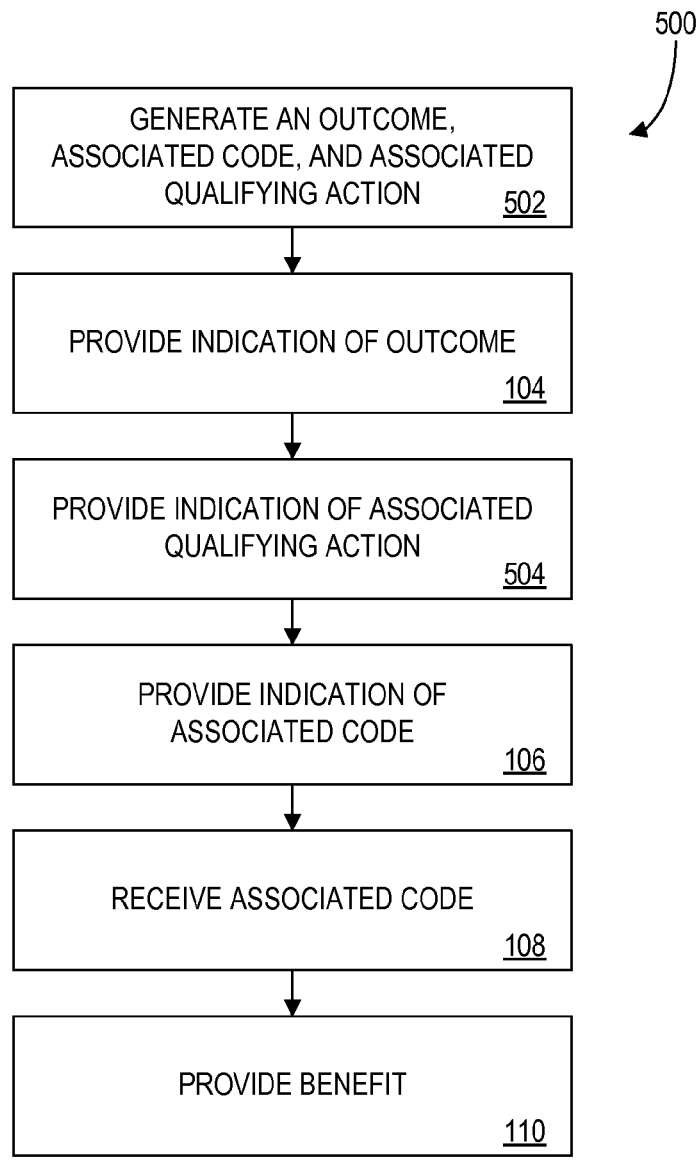
FIG. 6 is a flowchart of a second embodiment of a method in accordance with the present invention.

Now referring to FIG. 6, a second embodiment 500 of a method in accordance with the present invention is illustrated. The method 500 may be completed by the controller 52 and includes the steps 104, 106, 108 and 110 previously described above. In contrast to the method 100, the method 500 includes the step 502 instead of the step 102, during which the controller 52 generates one or more outcomes and one or more associated codes as previously described above. In addition, during a step 502 the controller 52 also generates a qualifying action associated with one or more of the generated outcomes or codes, in much the same way as the intermediary did during the step 204 previously described above. For example, the controller 52 may require that a user purchase a specific product, any product of a specific manufacturer, any product or service at a specific retailer, any product or service using a specific credit card, etc., as a qualifying action that a user must complete before being entitled to receive a code or unlock an outcome. As another example, the controller 52 may require that a user meet a specific demographic profile in order to receive a code or unlock an outcome. Note that an intermediary may still complete the step 204 and add or associate an additional qualifying action or criteria to an outcome or code such that a user must satisfy or complete both the qualifying action or criteria identified by the controller 52 during the step 502 and the qualifying action or criteria identified by the intermediary during the step 204.

During a step 504, the controller 52 provides an indication of the qualifying action(s) determined or generated during the step 502 to an intermediary, a user, or both. Thus, the step 504 is similar to the step 104, during which an indication of an outcome is provided to a user, and/or the step 106, during which an indication of a code is provided to an intermediary.

Figure 7:
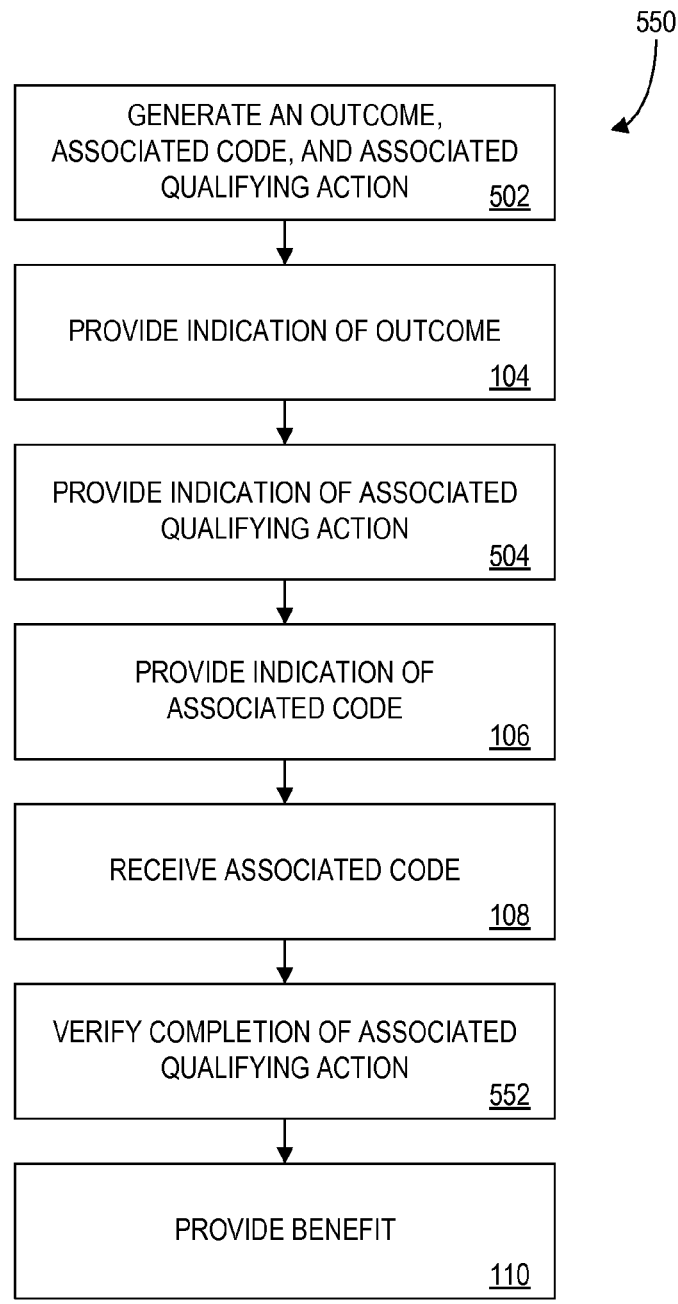
FIG. 7 is a flowchart of a third embodiment of a method in accordance with the present invention.

Now referring to FIG. 7, a third embodiment 550 of a method in accordance with the present invention is illustrated. The method 550 may be completed by the controller 52 and includes the steps 502, 104, 504, 106, 108 and 110 previously discussed above. In addition, the method 550 includes a step 552 during which the controller 52 verifies a user's completion of the qualifying action or criteria established during the step 502 and communicated to the user during the step 502. The method 550 may be used in conjunction with the method 200 and the method 300. Alternatively, the method 550 may be used with the method 300 and not the method 200. Thus, the method 550 is particularly useful when no intermediary or intermediary device is available or participating in a promotion and the entire activity or completion of, or participation in, the promotion occurs by the controller 52 and a user. In such embodiment, a user or user device may receive an indication of a qualifying action or criteria from the controller 52, as opposed to an intermediary device, during the step 304. Similarly, the user or user device may receive an unlock code from the controller 52, as opposed to an intermediary device, during the step 308.

When no intermediary or intermediary device is available or participating in a promotion, the controller 52 may also conduct many, if not all, of the steps of the method 200 as well as other activities. For example, the controller 52 may determine or identify at least one user to whom to provide an indication of an outcome, determine or identify at least one user to whom to provide an indication of an unlock code, determine or identify a qualifying action or criteria for receiving an unlock code, receive an indication of a behavior of a user or other recipient of an outcome or unlock code, characterize a behavior of a user or other recipient of an indication of an outcome or unlock code, compare a behavior of a user or other recipient of an indication of an outcome to a qualifying action established by the controller 52, etc.

In other embodiments of the methods discussed above, groups of two or more users or customers may work in a collaborative, complementary, or even competitive relationship to obtain benefits or unlock outcomes. In some embodiments some or all of the members of a group may know each other while in other embodiments none of the members of the group may know each other. For example, each person in a group may receive the same outcomes. In some embodiments, only the first person in the group to unlock an outcome may receive the benefit associated with the outcome. In other embodiments, every person in the group may receive a benefit associated with an outcome when a first person in the group unlocks the outcome. In still further embodiments, a benefit associated with an outcome may not be given or provided to any member of the group until all members of the group have unlocked the outcome individually.

In some embodiments, a group of people may be provided with the same outcome. The benefit provided to members of the group who unlock the outcome or to the entire group may increase each time a group member unlocks the outcome. In situations where the group members do no know each other, the group members may spend time locating and contacting other potential group members to share unlock codes, thereby resulting in the spreading of news and information about a promotion. The controller 52 or an intermediary may coordinate or establish a communication channel for group members, such as a chat room accessible by the group members via the communications network 58.

In some group oriented situations, each member may have to be present at a merchant to provide a redemption request or to receive a benefit. Alternatively, the group members may have to provide a single redemption request to the controller 52 or to an intermediary device or merchant.

In other embodiments of the methods described above, the controller 52 or an intermediary may allow a user to indicate that the user will not use one or more unlock codes and/or one or more outcomes previously provided to the user by the controller 52 or the intermediary. Thus, the controller 52 and/or the intermediary gains a better understanding of the user's participation and interest in a promotion. In some embodiments, the controller 52 or intermediary may provide a benefit to the user for providing such an indication or for returning unused unlock codes or outcomes previously provided to the user.

Figure 8:
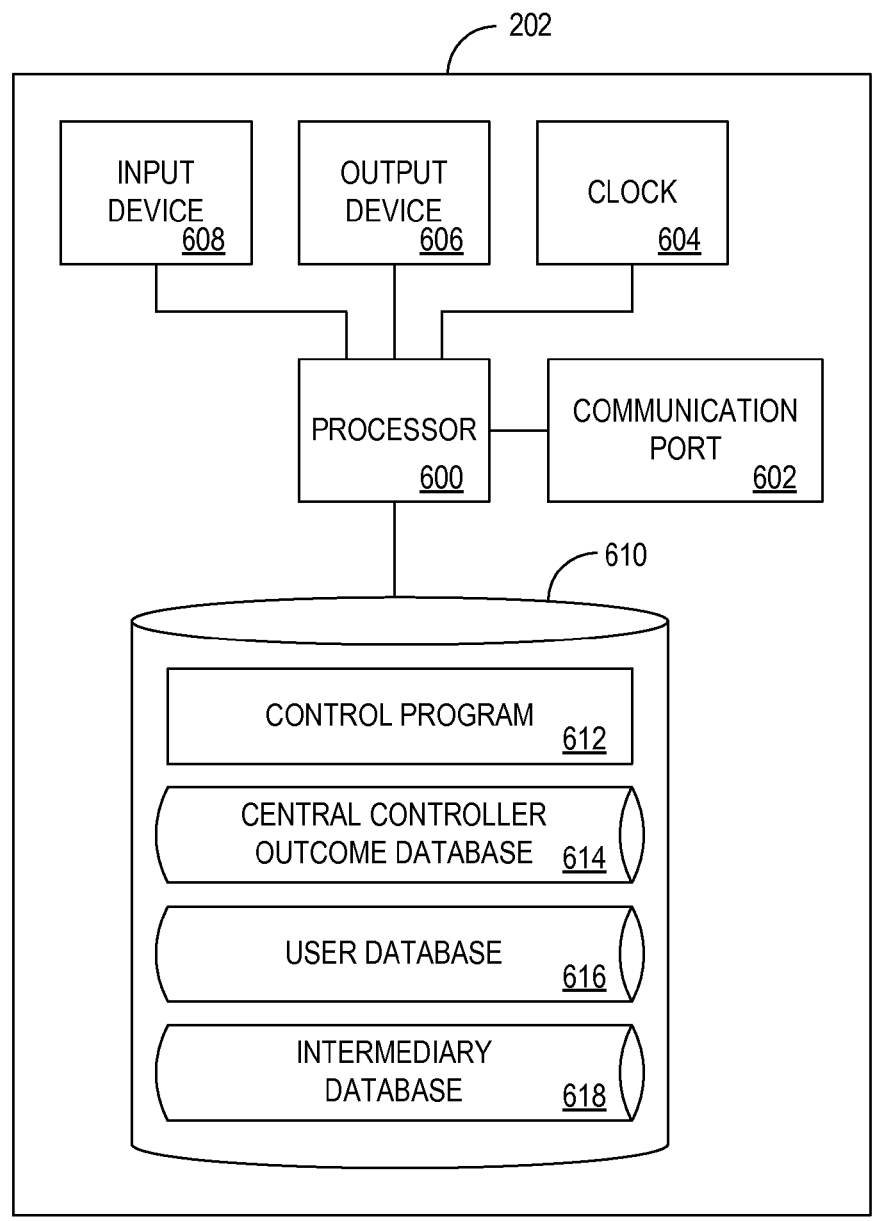
FIG. 8 is a block diagram illustrating a representative controller of FIG. 1.

Now referring to FIG. 8, a representative block diagram of a controller, such as the controller 52, is illustrated. The controller 52 may include a processor, microchip, central processing unit, or computer 600 that is in communication with or otherwise uses or includes one or more communication ports 602 for communicating with user or client devices and/or other devices. For example, if the controller 52 is connected to the user or customer device 54 via an Ethernet local area network and the intermediary device 56 via a cellular telephone network, the controller 52 may have an Ethernet adapter as one communication port to allow the controller 52 to communicate with the user device 54 and a connection to a cellular telephone network as another communication port to allow the controller 52 to communicate with the intermediary device 56.

The controller 52 may also include an internal clock element 604 to maintain an accurate time and date for the controller 52 and to create time stamps for outcomes, codes, indications, redemption requests etc., generated via the controller 52 or received by the controller 52.

In some embodiments, the controller 52 may include one or more output devices 606 such as a printer, infrared or other transmitter, antenna, audio speaker, display screen or monitor, text to speech converter, etc., as well as one or more input devices 608 such as a bar code reader or other optical scanner, infrared or other receiver, antenna, magnetic stripe reader, image seamier, roller ball, touch pad, joystick, touch screen, microphone, computer keyboard, computer mouse, etc. In addition, the controller 52 may include a voice recognition system or interactive voice response unit as an input device 608 to aid in or enable receiving and processing of redemption requests, outcomes, codes, etc. The controller 52 may also include a fingerprint scanner or reader, a retinal scanner, a voice analyzer, or other biometric data input device as an input device 608 to allow the controller 52 to identify users and other people.

In addition to the above, the controller 52 may include a memory or data storage device 610 to store information, software, databases, device drivers, user information, outcomes, codes, redemption requests, qualifying action information, product or service information, encryption or cryptographic software, random number generation software, etc. The memory or data storage device 610 preferably comprises an appropriate combination of magnetic, optical and/or semiconductor memory, and may include, for example, Random Access Memory (RAM), Read-Only Memory (ROM), a tape drive, flash memory, a floppy disk drive, a ZIP™ disk drive, a compact disc and/or a hard disk. The processor 600 and the data storage device 610 in the controller 52 may each be, for example: (i) located entirely within a single computer or other computing device; or (ii) connected to each other by a remote communication medium, such as a serial port cable, telephone line or radio frequency transceiver. In one embodiment, the controller 52 may comprise one or more computers that are connected to a remote server computer for maintaining databases.

A conventional personal computer or workstation with sufficient memory and processing capability may be used as the controller 52. In one embodiment, the controller 52 operates as or includes a web server for an Internet environment. The controller 52 preferably transmits and receives data related to transactions, outcomes, qualifying actions, codes, etc., and is capable of high volume transaction processing, performing a significant number of mathematical calculations in processing communications and database searches. A Pentium™ microprocessor, such as the Pentium III™ microprocessor manufactured by Intel Corporation, may be used for the processor 610. Equivalent processors are available from Motorola, Inc., AMD, or Sun Microsystems, Inc. The processor 610 may also comprise one or more microprocessors, computers, computer systems, etc. In some embodiments, the controller 52 may also include a cryptographic processor and/or a random number generator.

Software may be resident and operating or operational on the controller 52. The software may be stored on the data storage device 610 and may include some or all of the following: a control program 612 for operating the controller 52 and for performing one or more of the steps of the methods described herein; an outcome database 614 for storing information about outcomes generated by the controller 52; a user database 616 for storing information about users, user devices, customers, etc.; and an intermediary database 618 for storing information regarding intermediaries, intermediary devices, etc.

Each of the databases 614, 616, 618 and their use and potential data structure will be discussed in more detail below. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only. Thus, those skilled in the art will understand that the number and content of the entries can be different from those illustrated herein. Not all of the databases 614, 616, 618 will be used or needed in every embodiment of the method 100 or the system 50. Furthermore, some embodiments of the method 100 or the system 50 may use none or only some of the databases 614, 616, 618. Of course, there may be embodiments of the method 100 or the system 50 where all of the databases 614, 616, 618 are used.

The control program 612 may control the processor 600. The processor 600 preferably performs instructions of the control program 612, and thereby operates in accordance with the present invention, and particularly in accordance with the methods described in detail herein. The control program 612 may be stored in a compressed, uncompiled and/or encrypted format. The control program 612 furthermore includes program elements that may be necessary, such as an operating system, a database management system and device drivers for allowing the processor 600 to interface with peripheral devices, databases, etc. The control program 612 may include or access software to generate outcomes, unlock codes, benefits, qualifying actions, etc. and receive redemption requests and other indications. Appropriate program elements are known to those skilled in the art, and need not be described in detail herein. According to an embodiment of the present invention, the instructions of the control program 612 may be read into a main memory from another computer-readable medium, such as from a ROM to RAM. Execution of sequences of the instructions in the control program 612 causes the processor 600 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

As previously discussed above, the outcome database 614 can be used to store information and data regarding outcomes generated, provided, redeemed, etc., by the controller 52. The outcome database 614 may be populated, used, accessed, and/or updated by the controller 52 during any of the steps of the method 100.

A tabular representation of a possible implementation of or data structure for, the outcome database 614 is illustrated in FIG. 9. The outcome database 614 includes an outcome identifier field 650 which may include identifiers or other identifying information for outcomes generated or provided by the controller 52, a distribution status field 652 which may include information regarding whether or not the controller 52 has issued or provided the outcomes identified in the field 650 to users, a date issued field 654 which may include date and/or time information for the outcomes identified in the field 650 that have been issued or provided to users by the controller 52, a user device identifier field 656 which may include identifiers or other identifying information for user devices to which the outcomes identified in the field 650 have been sent or provided by the controller 52, a payout or benefit field 658 which may include information regarding a financial amount or payout or other benefit associated with the outcomes identified in the field 650, a redeemed field 658 which may contain information regarding whether a user has redeemed or unlocked an outcome identified in the field 650, an intermediary identifier field 662 which may contain identifiers or other identifying information regarding the intermediary for whom a user obtained a code that unlocked a redeemed outcome listed in the field 650, and a paid status field 664 which may indicate whether or not the intermediary listed in the field 662 paid for the unlock code that a user used to unlock or redeem an outcome listed in the field 650.

While the outcome database 614 illustrated in FIG. 9 provides information for three outcomes 666, 668, and 670 identified by the outcome identifiers "O-000001," "O-000002" and "O-000003," respectively, in the outcome identifier field 650, there is no limit to the number of outcomes for which information can be stored in the outcome database 614 and different fields may be used in the outcome database 614.

As previously discussed above, the user database 616 can be used to store information and data regarding users, user devices, etc. The user database 616 may be populated, used, accessed, and/or updated by the controller 52 during any of the steps of the methods disclosed herein. A tabular representation of a possible implementation of, or data structure for, the user database 616 is illustrated in FIG. 10.

The user database 616 includes a user device identifier field 700 which may include an identifier or other identifying information for a user device, a user name field 702 which may includes the names of users associated with the user devices identified in the field 700, a financial account identifier field 704 which may include financial account numbers, credit card numbers, bank account numbers, etc., for the users identified in the field 702, and a contact information field 706 which may include telephone numbers, postal addresses, email addresses, facsimile numbers, or other contact information for the users listed in the field 702.

While the user database 616 illustrated in FIG. 10 provides information for three user devices and associated users 708, 710, 712 identified by the user device identifiers "UD-234D," "UD-593D" and "UD-202D," respectively, in the user device identifier field 700, there is no limit to the number of users, user devices, etc., for which information can be stored in the user database 616 and different fields may be used in the user database 616.

As previously discussed above, the intermediary database 618 can be used to store information and data regarding intermediaries, intermediary devices, etc. The intermediary database 618 may be populated, used, accessed, and/or updated by the controller 52 during any of the steps of the methods disclosed herein. A tabular representation of a possible implementation of, or data structure for, the intermediary database 618 is illustrated in FIG. 11.

The intermediary database 618 includes an intermediary device identifier field 720 which may include an identifier or other identifying information for an intermediary device, an intermediary name field 722 which may include the names of intermediaries associated with the intermediary devices identified in the field 720, and a contact information field 724 which may include telephone numbers, postal addresses, email addresses, facsimile numbers, or other contact information for the intermediaries listed in the field 720.

While the intermediary database 618 illustrated in FIG. 11 provides information for three intermediary devices and associated intermediaries 726, 728, 730 identified by the intermediary device identifiers "ID-353," "ID-251" and "ID-933," respectively, in the intermediary device identifier field 720, there is no limit to the number of intermediaries, intermediary devices, etc., for which information can be stored in the intermediary database 618 and different fields may be used in the intermediary database 618.

Figure 12:
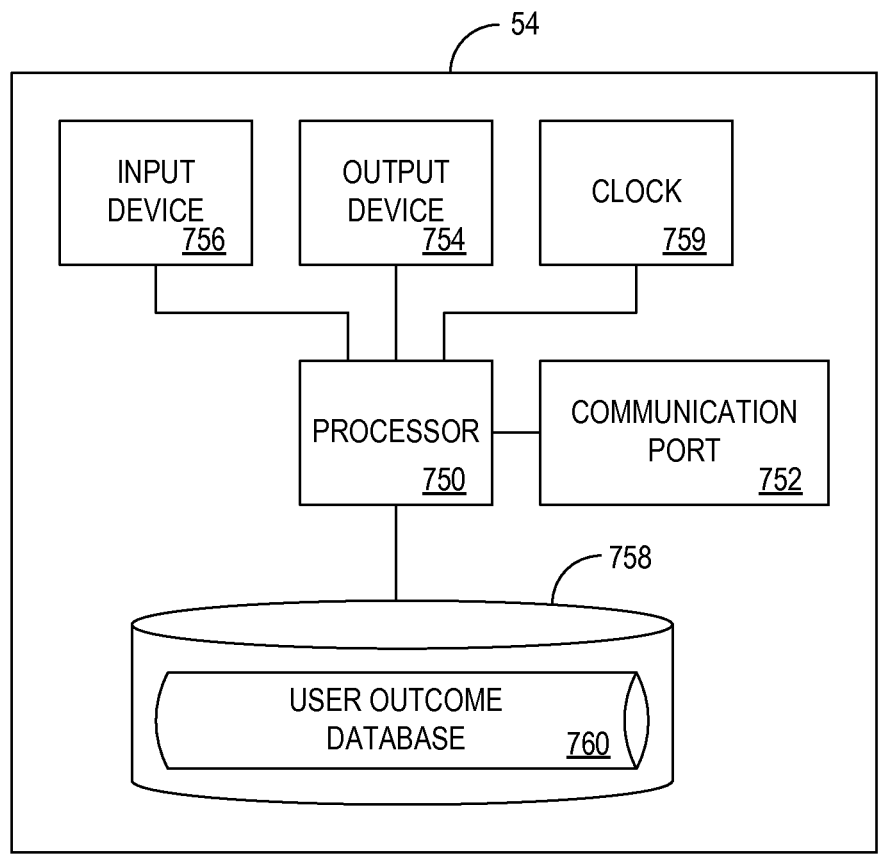
FIG. 12 is a block diagram illustrating a representative user device of FIG. 1.

Now referring to FIG. 12, a representative block diagram of a user or other customer device, such as the user device 54, is illustrated. The user device 54 may include a processor, central processing unit, microchip, or computer 750 that is in communication with or otherwise uses or includes one or more communication ports 752 for communicating with the controller 52 and/or with the intermediary device 56 and/or other devices. For example, the user device 54 may have an infrared or other wireless transmitter as one communication port to allow the user device 54 to wirelessly communicate with the controller 52. In addition, if the user device 52 is connected to the controller 52 via an Ethernet local area network, the user device 54 will preferably include an Ethernet adapter as a communication port to allow the user device 54 to communicate with the controller 52.

The user device 54 may include one or more output devices 754 to allow a user to hear, print or view information, messages, codes, outcomes, qualifying actions, etc., received from the controller 52 or an intermediary device, such as a printer, audio speaker, infrared or other transmitter, antenna, display screen or monitor, text to speech converter, etc., as well as one or more input devices 756 for receiving information, messages, indications, etc., from a user, such as a bar code reader or other optical scanner, infrared or other receiver, antenna, magnetic stripe reader, image scanner, roller ball, touch pad, joystick, touch screen, microphone, computer keyboard, computer mouse, etc. A user device 54 may include a voice recognition system or interactive voice response unit as an input device 756 to aid in receiving and processing inputs or entries made by a user. The user device 54 may also include a fingerprint scanner or reader, a retinal scanner, a voice analyzer, or other biometric data input device as an input device 756 to allow the user device 54 to be accurately identified or to allow a user to provide biometric information as part of a redemption request, outcome request, or unlock code request.

In addition to the above, the user device 54 may include a memory or data storage device 758 to store information, software, databases, device drivers, customer information, customer identifications, outcomes, codes, qualifying actions, encryption or cryptographic software, random number generation software, etc. The memory or data storage device 758 preferably comprises an appropriate combination of magnetic, optical and/or semiconductor memory, and may include, for example, Random Access Memory (RAM), Read-Only Memory (ROM), a tape drive, flash memory, a floppy disk drive, a ZIP™ disk drive, a compact disc and/or a hard disk.

The user device 54 may also include an internal clock element 759 to maintain an accurate time and date for the user device 54, create time stamps for information, outcomes, codes, qualifying actions, etc., generated or received via the user device 54. In some embodiments, the user device 54 may also include a cryptographic processor and/or a random number generator.

As previously discussed above, user devices may comprise or include a personal computer, portable computer or laptop computer, mobile or fixed user station, workstation, network terminal or server, telephone, beeper, kiosk, dumb terminal, personal digital assistant, facsimile machine, etc. In some embodiments, the user device 54 may also function as the controller 52 or as an intermediary device. Also, the user device 54 may include a control program similar to the control program 612 previously discussed above for the controller 52.

In some embodiments, the user device 54 may have a unique serial number or other user device identifier associated with it or encoded on it that is accessible via software. For example, the Palm Pilot™ series of personal digital assistants manufactured by Palm. Inc. uses a software accessible serial number. The serial number may be used to associate specific outcomes and/or unlock codes with a specific user device so that an unlock code can only be used to unlock or otherwise reveal outcomes on the specific user device, an outcome can only be stored on or used by a specific user device, etc. The serial number may be provided by a user or the user device when a user is requesting or receiving outcomes and/or unlock codes.

In some embodiments, the user device 54 may include a Global Positioning System (GPS) detector, sensor or receiver or other tracking device so that the location or position of the user device 54, or the location or position of a user associated with the user device 54, can be ascertained. As previously discussed above, different outcomes, unlock codes, benefits, qualifying actions, etc. may be provided to a user or transmitted to a user device based on the user's or user device's location.

The user device 54 may include a user outcome database 760 to store information and data regarding outcomes received by the user device. The user outcome database 76 may be populated, used, accessed, and/or updated by the user device 54 when receiving outcomes, codes, qualifying actions, etc., during any of the steps of the methods 100, 300. A tabular representation of a possible implementation of, or data structure for, the user outcome database 760 is illustrated in FIG. 13.

The outcome database 760 includes an outcome position field 800 which may include information regarding an order in which outcomes were received, an order in which outcomes are to be unlocked, an order of expiration for one or more outcomes, etc., an outcome identifier field 802 which may include identifiers or other identifying information for outcomes received from the controller 52, a payout field 804 which may include information regarding a financial amount or payout associated with the outcomes identified in the field 802, a status field 806 which may contain information regarding whether a user has used, redeemed or unlocked an outcome identified in the field 802, an unlock code field 808 which may contain information regarding a code used to unlock the outcomes identified in the field 802, a category field 810 which may contain information regarding the type of prize an outcome may reveal (e.g., "Gold" outcomes may have a higher expected value than other types of outcomes), and an intermediary identifier field 812 which may contain identifiers or other identifying information regarding the intermediary for whom a user obtained a code listed in the field 808 that the user used to unlock the corresponding outcome identified in the field 650, and a paid for field 664 which may indicate whether or not the intermediary listed in the field 802 has been paid.

While the user outcome database 760 illustrated in FIG. 13 provides information for three user outcomes 814, 816 and 818 identified by the outcome position identifiers "OP-0001," "OP-0002" and "OP-0003," respectively, in the outcome position identifier field 800, there is no limit to the number of outcomes for which information can be stored in the user outcome database 760 and different fields may be used in the user outcome database 760.

Figure 14:
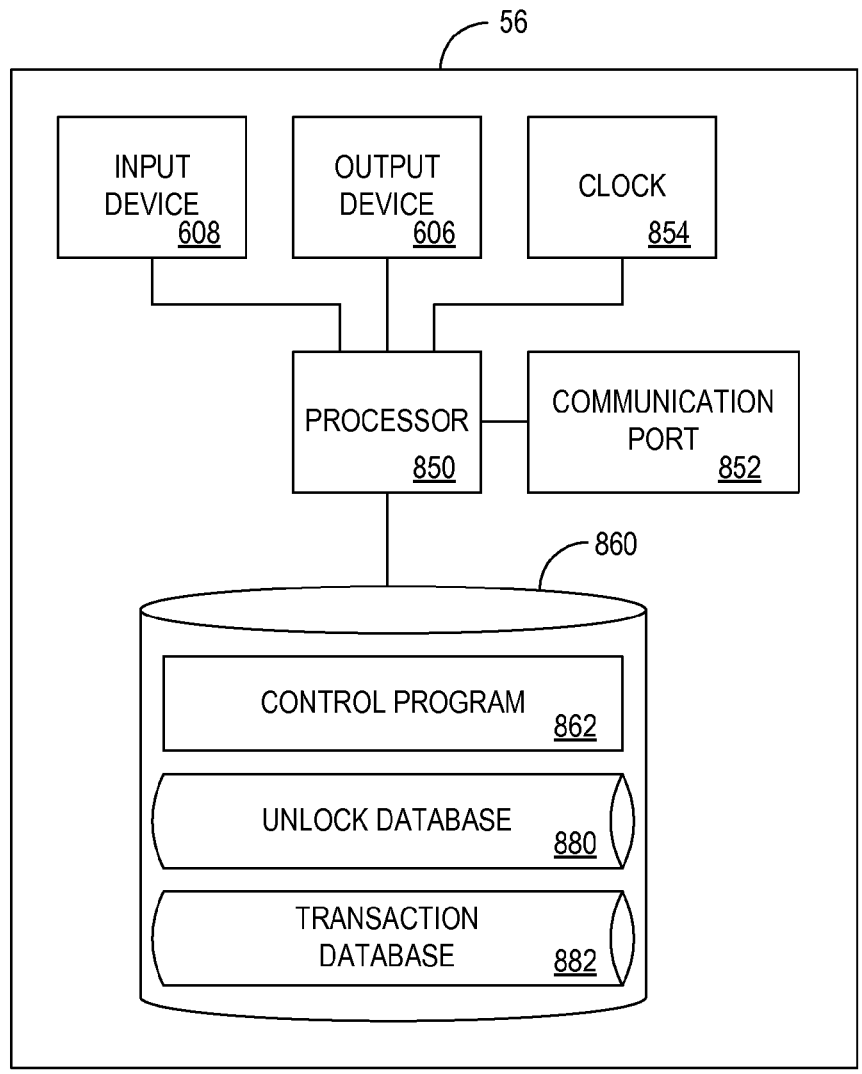
FIG. 14 is a block diagram illustrating a representative intermediary device of FIG. 1.

Now referring to FIG. 14, a representative block diagram of an intermediary device, such as the intermediary device 56, is illustrated. The intermediary device 56 may include a processor 850, a communications port 852, a clock 854, an output device 856, an input device 858, a storage device 860, and a control program 862. The processor 850, a communications port 852, a clock 854, an output device 856, an input device 858, a storage device 860, and a control program 862 may work in a similar fashion to the processor 600, communications port 602, clock 604, output device 606, input device 608, storage device 610, and control program 612, respectfully, in the controller 52 previously described above. In addition, the intermediary device 56 may include an unlock database 880 for storing information regarding codes received by the intermediary device from the controller 52 and provided to users, as well as any qualifying actions or criteria associated with the codes, and a transaction database 882 for storing information regarding transactions that the intermediary device 56 is conducting or participating in.

As previously discussed above, the user unlock database 880 can be used to store information and data regarding codes and qualifying actions or criteria associated with outcomes. The unlock database 880 may be used, accessed, and/or updated by the intermediary device 56 during any of the steps of the method 200. A tabular representation of a possible implementation of, or data structure for, the user unlock database 880 is illustrated in FIG. 15.

The database 880 includes an activity identifier field 900 which may contain identifiers or other identifying information regarding qualifying actions or criteria that may need to be performed by a user before the intermediary will provide a code to the user, an activity description field 902 which may contain description information for the qualifying actions or criteria identified in the field 900, and an unlock code field 904 which may contain information regarding which unlock codes will be provided to a user once the user completes or satisfies the qualifying criteria or actions identified in the field 900. While the user unlock database 880 illustrated in FIG. 15 provides information for two qualifying activities 906 and 908 identified by the activity identifiers "A-001 and "A-002," respectively, in the activity identifier field 900, there is no limit to the number of activities or codes for which information can be stored in the user unlock database 880 and different fields may be used in the user unlock database 880.

As previously discussed above, the transaction database 882 can be used to store information and data regarding transactions, outcomes, codes, user devices, users, etc. The transaction database 882 may be used, accessed, and/or updated by the intermediary device 56 during any of the steps of the method 200. A tabular representation of a possible implementation of, or data structure for, the transaction database 882 is illustrated in FIG. 16.

The transaction database 882 includes a transaction identifier field 902 which may contain identifiers or other identifying information for transactions completed, initiated or otherwise conducted by the intermediary, an unlock code field 922 which may contain codes received or provided by the intermediary during the transactions identified in the field 920, a date/time field 924 which may include date and/or time information for the transactions identified in the field 920, and a user device identifier field 926 which may include user device identifiers for user devices involved in the transactions identified in the field 920.

While the transaction database 882 illustrated in FIG. 16 provides information for two transactions 928 and 930 identified by the transaction identifiers "T-0001" and "T-0002," respectively, in the transaction identifier field 920, there is no limit to the number of transactions for which information can be stored in the transaction database 882 and different fields may be used in the transaction database 882.

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be considered as falling within the scope of the invention as defined by the claims that follow. Further, even though only certain embodiments have been described in detail, those having ordinary skill in the art will certainly understand that many modifications are possible without departing from the teachings thereof. All such modifications are intended to be encompassed within the following claims.

The present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

While specific implementations and hardware configurations for the controller 52, user device 54, and intermediary device 56 have been illustrated, it should be noted that other implementations and hardware configurations are possible and that no specific implementation or hardware configuration is needed. Therefore, many different types of implementations or hardware configurations can be used in the system 50 and with the methods 100, 200, 300, 500, 550 and the methods disclosed herein are not limited to any specific hardware configuration.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, ZIP™ disk, flash or optical memory card, microprocessor, solid state memory device, RAM, EPROM, or ROM.

The term "computer-readable medium" as used herein refers to any medium that directly or indirectly participates in providing instructions to a processor for execution. Such a medium may take many forms, including but not limited to, non-volatile media, volatile media, and transmission media. Non-volatile media include, for example, optical or magnetic disks. Volatile media include dynamic random access memory (DRAM). Transmission media include coaxial cables, copper wire and fiber optics, including the wires that comprise a system bus coupled to a processor. Transmission media can also take the form of acoustic, electrical or electromagnetic waves, such as those generated during radio frequency (RF) and infrared (IR) data communications.

The connections or communications between user devices, intermediary devices, the controller 52, etc., discussed herein is only meant to be generally representative of cable, computer, telephone, or other communication or data networks and methods for purposes of elaboration and explanation of the present. The connections are also intended to be representative of, and include all or a part of, the Internet, the World Wide Web, and other privately or publicly operated networks, including wide area networks, local area networks, data communication networks or connections, intranets, extranets, cable modems, routers, satellite links or networks, microwave links or networks, cellular telephone or radio links, fiber optic transmission lines, ISDN lines, T1 lines, etc. In addition, as used herein, the terms "computer," "user device," "terminal," "client," "device," "customer device" and "client device" are generally interchangeable and are meant to be construed broadly and to include, but not be limited to, all clients, client devices or machines, personal digital assistants and palm top computers, cash registers, terminals, computers, point-of-sale devices, processors, servers, etc., connected or connectable to a computer or data communications network and all devices on which Internet-enabled software, such as the NETSCAPE COMMUNICATOR™ or NAVIGATOR™ browsers, MOSAIC™ browser, or MICROSOFT INTERNET EXPLORER™ browsers, can operate or be run. The term "browser" should also be interpreted as including Internet-enabled software and computer or client software that enables or allows communication over a computer network and Internet-enabled or World Wide Web enabled, monitored, or controlled devices such as WebTV™ devices, household appliances, phones, etc.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A mobile device operable to facilitate a game playable on the mobile device, the mobile device comprising:
    an input mechanism for receiving input from a user of the mobile device;
    a display screen for outputting results of the game;
    a processor;
    a memory, the memory operable to store a first software program for conducting the game on the mobile device and a locked outcome of the game such that, upon the first software program being stored in the memory, the processor is operable with the first software program to:
        facilitate play of the game by recognizing inputs from the user via the input mechanism;
        receive a signal comprising an unlock code;
        unlock the locked outcome of the game using the unlock code, thereby determining an unlocked outcome;
        determine an intra-game benefit associated with the unlocked outcome; and incorporate the intra-game benefit into the game while it is being played on the mobile device by the user.

2. The mobile device of claim 1, wherein the processor being operable with the first software program to receive a signal comprising the unlock code comprises the processor being operable with the first software program to receive an input from the user via the input mechanism, the input comprising the signal.

3. The mobile device of claim 1, wherein the processor being operable with the first software program to receive a signal comprising the unlock code comprise the processor being operable with the first software program to receive a signal from a third party via a network via which the mobile device is operable to communicate with the third party.

4. The mobile device of claim 1, wherein the processor being operable with the first software program to receive a signal comprising the unlock code comprises the processor being operable with the first software program to:
receive a request to use a previously stored unlock code to unlock the locked outcome.

5. The mobile device of claim 1, wherein the locked outcome comprises an outcome stored in an encrypted form such that the intra-game benefit associated with the locked outcome is not obtainable by the user without an acceptable unlock code being used to unlock the locked outcome and thereby allow an enjoyment of the intra-game benefit.

6. The mobile device of claim 1, wherein the processor is further operable with the first software program to download the locked outcome over the internet prior to receiving the signal comprising the unlock code.

7. The mobile device of claim 1, wherein the processor is further operable with the first software program to receive indication of payment from the user, the payment being for the unlock code.

8. The mobile device of claim 7, wherein the processor being operable with the first software program to unlock the locked outcome using the unlock code comprises the processor being operable with the first software program to unlock the locked outcome using the unlock code only if it is first verified that payment for the unlock code has been provided by the user.

9. The mobile device of claim 1, wherein the intra-game benefit comprises an advancement within the game.

10. The mobile device of claim 9, wherein the advancement in the game is unobtainable by the player without use of the unlock code.

11. The mobile device of claim 1, wherein the memory stores a second software program for operating the device, and further wherein the processor is operable with the second software program to download at least one of the first software program and a decryption algorithm into the memory.

12. The mobile device of claim 1, wherein the processor is further operable with the first software program to verify that the user has completed a qualifying activity that is a prerequisite to unlocking the locked outcome.

13. The method of claim 12, wherein the qualifying activity is watching a specified advertisement.

14. The mobile device of claim 1, further comprising a GPS detector and wherein the processor is further operable with the first software program to:
detect a location of at least one of the user or the device by use of the GPS detector.

15. The mobile device of claim 14, wherein the processor being operable with the first software program to determine an intra-game benefit associated with the unlocked outcome comprises the processor being operable with the first software program to determine an intra-game benefit based on the location.

16. The mobile device of claim 1, wherein the intra-game benefit comprises at least one of an enhancement of the game, a modification of the game, a conclusion of the game, an increase in the user's chances of winning the game, an increase in the user's chances of successfully completing the game, continued access to the game or a game piece usable in the game.

17. The mobile device of claim 1, wherein the first software program comprises the locked outcome.

18. A non-transitory computer-readable medium storing instructions for directing a processor of a mobile device to perform a method, the method comprising:
facilitating play of a game on the mobile device by recognizing inputs provided by a user via an input mechanism of the mobile device, at least one of the inputs causing progress in the game;
receiving a signal comprising an unlock code;
determining a locked outcome of the game;
unlocking the locked outcome of the game using the unlock code, thereby determining an unlocked outcome;
determining an intra-game benefit associated with the unlocked outcome; and
providing the intra-game benefit to the user by incorporating the intra-game benefit into the game.

19. The non-transitory computer-readable medium of claim 18, wherein the locked outcome of the game is stored in a memory of the mobile device prior to the unlock code being received and wherein the method further comprises retrieving the locked outcome from the memory.

20. The non-transitory computer-readable medium of claim 18 further storing the locked outcome of the game prior to receiving the signal comprising the unlock code, wherein the method further comprises accessing the previously stored locked outcome.

21. The non-transitory computer-readable medium of claim 18, wherein the method further comprises receiving an input from the user via the input mechanism, the input comprising the signal.

22. The non-transitory computer-readable medium of claim 18, wherein receiving the signal comprising the unlock code comprises receiving the signal from a third party via a network via which the mobile device is operable to communicate with the third party.

23. The non-transitory computer-readable medium of claim 18, wherein the method further comprises:
receiving a request to use a previously stored unlock code to unlock the locked outcome.

24. The non-transitory computer-readable medium of claim 18, wherein the method further comprises downloading the locked outcome over the internet prior to receiving the signal comprising the unlock code.

25. The non-transitory computer-readable medium of claim 18, wherein the locked outcome comprises an outcome stored in an encrypted form such that the intra-game benefit associated with the locked outcome is not obtainable by the user without an acceptable unlock code being used to unlock the locked outcome and thereby allow an enjoyment of the intra-game benefit.

26. The non-transitory computer-readable medium of claim 18, the method further comprising:
receiving indication of payment from the user, the payment being for the unlock code.

27. The non-transitory computer-readable medium of claim 18, wherein the intra-game benefit comprises at least one of an enhancement of the game, a modification of the game, a conclusion of the game, an increase in the user's chances of winning the game, an increase in the user's chances of successfully completing the game, continued access to the game or a game piece usable in the game.

28. The non-transitory computer-readable medium of claim 18, wherein the wherein the intra-game benefit comprises an advancement within the game.

29. The non-transitory computer-readable medium of claim 28, wherein the advancement in the game is unobtainable by the player without use of the unlock code.

30. The non-transitory computer-readable medium of claim 18, wherein the method further comprises:
   verifying that the user has completed a qualifying activity that is a prerequisite to unlocking the locked outcome and only allowing the locked outcome to be unlocked if it is verifying that the user has completed the qualifying activity.

31. The non-transitory computer-readable medium of claim 30, wherein the qualifying activity is watching a specified advertisement.

32. The non-transitory computer-readable medium of claim 18, wherein the method further comprises using a GPS detector of the mobile device to detect a location of at least one of the user or the mobile device.

33. The non-transitory computer-readable medium of claim 32, wherein determining the intra-game benefit associated with the unlocked outcome comprises determining the intra-game benefit based on the location.

\* \* \* \* \*